US011859414B2

(12) United States Patent
Kao et al.

(10) Patent No.: US 11,859,414 B2
(45) Date of Patent: Jan. 2, 2024

(54) SECURITY APPARATUS INCLUDING A REMOTE ACTUATOR ASSEMBLY

(71) Applicant: ACCO BRANDS CORPORATION, Lake Zurich, IL (US)

(72) Inventors: James Kao, Fremont, CA (US); John Hung, Northern Vancouver (CA); Bruce Fitz-Earle, Nelson (CA); Mike Otsuka, Sunnyvale, CA (US); William De Meulenaere, Newark, CA (US)

(73) Assignee: ACCO BRANDS CORPORATION, Lake Zurich, IL (US)

( * ) Notice: Subject to any disclaimer, the term of this patent is extended or adjusted under 35 U.S.C. 154(b) by 618 days.

(21) Appl. No.: 17/080,236

(22) Filed: Oct. 26, 2020

(65) Prior Publication Data

US 2021/0040780 A1 Feb. 11, 2021

Related U.S. Application Data

(63) Continuation of application No. 16/740,877, filed on Jan. 13, 2020, now Pat. No. 10,815,699, which is a
(Continued)

(51) Int. Cl.
*E05B 73/00* (2006.01)
*G06F 1/16* (2006.01)
(Continued)

(52) U.S. Cl.
CPC .......... *E05B 73/0082* (2013.01); *E05B 73/00* (2013.01); *E05B 73/0005* (2013.01);
(Continued)

(58) Field of Classification Search
CPC .. E05B 73/0005; E05B 73/00; E05B 73/0082; E05B 73/0029; E05B 37/02;
(Continued)

(56) References Cited

U.S. PATENT DOCUMENTS 1,880,135 A 9/1932 Heath
2,084,045 A 6/1937 Elling
(Continued)

FOREIGN PATENT DOCUMENTS

CN 201810076 U 4/2011
DE 4310590 A1 10/1994
(Continued)

OTHER PUBLICATIONS

First Office Action from the State Intellectual Property Office of the People's Republic of China for Application No. 201410648633.3 dated May 5, 2016 (12 pages).
(Continued)

*Primary Examiner* — Suzanne L Barrett
(74) *Attorney, Agent, or Firm* — Michael Best & Friedrich LLP

(57) ABSTRACT

A security apparatus for a portable electronic device includes a force-transmission member having a length, a first end, and a second end. A lock head is coupled to the first end of the force-transmission member, the lock head configured to selectively engage the electronic device and movable by the force-transmission member between a locked position, in which the lock head is secured to the electronic device, and an unlocked position, in which the lock head is unsecured from the electronic device. An actuator assembly is spaced a distance from the lock head along the length of the force-transmission member. The actuator assembly includes a body and a manual actuator pivotally coupled to the body, the manual actuator being pivotable from a first position to a second position to move the movable member relative to the body such that the lock head moves from the unlocked position to the locked position.

18 Claims, 30 Drawing Sheets

Related U.S. Application Data continuation of application No. 16/120,955, filed on Sep. 4, 2018, now Pat. No. 10,563,432, which is a continuation of application No. 14/711,914, filed on May 14, 2015, now Pat. No. 10,066,423, which is a continuation of application No. 14/469,016, filed on Aug. 26, 2014, now Pat. No. 9,062,476.

(60) Provisional application No. 61/943,662, filed on Feb. 24, 2014, provisional application No. 61/870,964, filed on Aug. 28, 2013.

(51) Int. Cl.
 *E05B 37/02* (2006.01)
 *E05B 53/00* (2006.01)

(52) U.S. Cl.
 CPC ............... *G06F 1/16* (2013.01); *E05B 37/02* (2013.01); *E05B 53/005* (2013.01); *Y10T 70/5009* (2015.04)

(58) Field of Classification Search
 CPC ........ E05B 53/003; E05B 53/005; G06F 1/16; Y10T 70/5009
 USPC .............................................. 70/58, 256, 257
 See application file for complete search history.

(56) References Cited

U.S. PATENT DOCUMENTS

| | | | |
|---|---|---|---|
| 2,548,242 A | 4/1951 | Rosenbarger |
| 2,598,670 A | 6/1952 | Bentley et al. |
| 3,538,725 A | 11/1970 | Guenther et al. |
| 3,744,285 A | 7/1973 | Barmherzig |
| 3,766,341 A | 10/1973 | Guenther et al. |
| 3,910,081 A | 10/1975 | Pender |
| 4,223,542 A | 9/1980 | Basseches |
| 4,525,004 A | 6/1985 | Tanaka |
| 4,796,929 A | 1/1989 | Gergoe |
| 4,875,350 A | 10/1989 | Faust |
| 4,903,510 A | 2/1990 | Surles |
| 5,535,608 A | 7/1996 | Brin |
| 6,006,557 A | 12/1999 | Carl et al. |
| 6,257,029 B1 | 7/2001 | Liao |
| 6,295,847 B1 | 10/2001 | Zeren |
| 6,301,940 B1 | 10/2001 | Derman et al. |
| 6,701,760 B1 | 3/2004 | Elliason |
| 7,013,685 B2 | 3/2006 | Francke |
| 7,191,623 B2 | 3/2007 | Francke |
| 7,201,029 B2 | 4/2007 | Murray, Jr. et al. |
| 7,204,106 B2 | 4/2007 | Merrem et al. |
| 7,409,842 B2 | 8/2008 | Kuo |
| 7,479,879 B2 | 1/2009 | Merrem et al. |
| 7,606,024 B2 | 10/2009 | Boss et al. |
| 7,948,751 B2 | 5/2011 | Escamilla et al. |
| 7,997,106 B2 | 8/2011 | Mahaffey et al. |
| 8,230,707 B2 | 7/2012 | Hung et al. |
| 8,534,676 B2 | 9/2013 | Whisenand et al. |
| 8,833,117 B2 | 9/2014 | Yang |
| 8,842,422 B2 | 9/2014 | Hung et al. |
| 9,062,476 B2 | 6/2015 | Kao et al. |
| 10,066,423 B2 | 9/2018 | Kao et al. |
| 10,233,676 B2 | 3/2019 | Lin |
| 10,563,432 B2 | 2/2020 | Kao et al. |
| 2002/0162369 A1 | 11/2002 | Lurie et al. |
| 2011/0007475 A1 | 1/2011 | Escamilla et al. |
| 2014/0290315 A1 | 10/2014 | Yang |

FOREIGN PATENT DOCUMENTS

| | | |
|---|---|---|
| TW | M242558 U | 9/2004 |
| TW | 200825262 A | 6/2008 |

OTHER PUBLICATIONS

Extended European Search Report from the European Patent Office for Application No. 14182636.2 dated Mar. 10, 2016 (7 pages).
European Patent Office Extended Search Report for Application No. 18207881.6 dated Jan. 22, 2019 (7 pages).

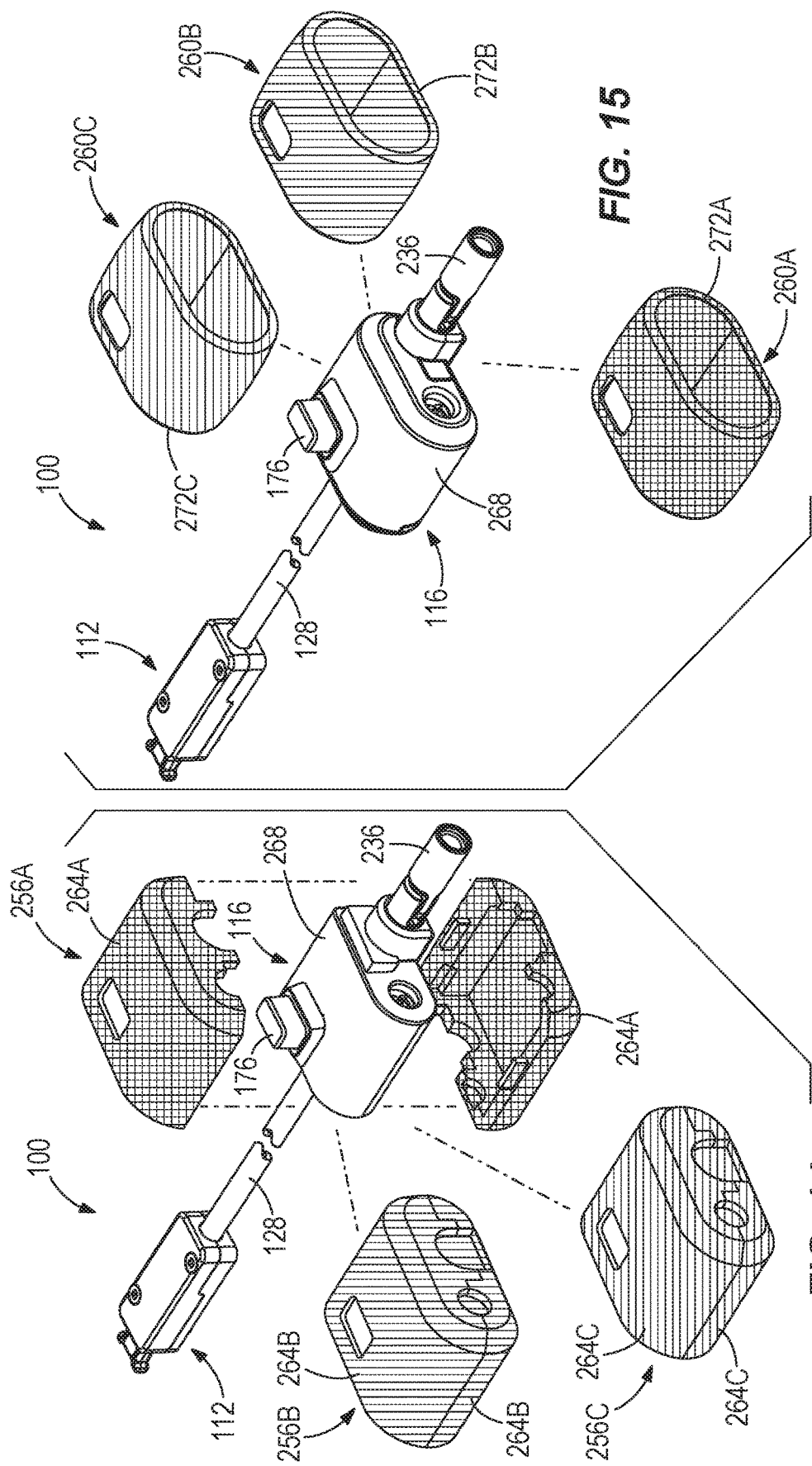

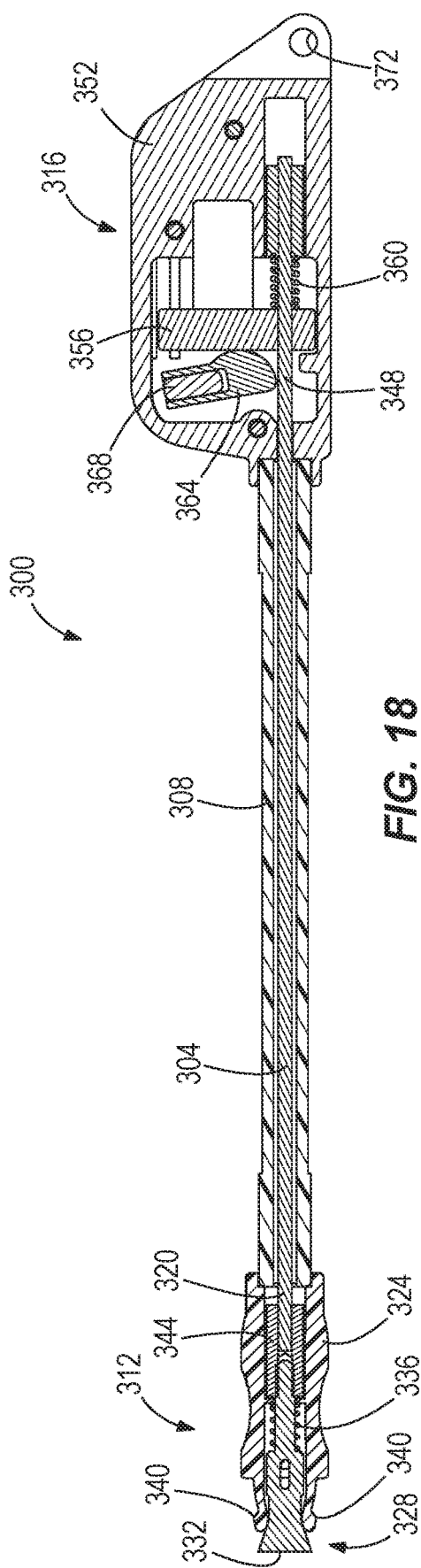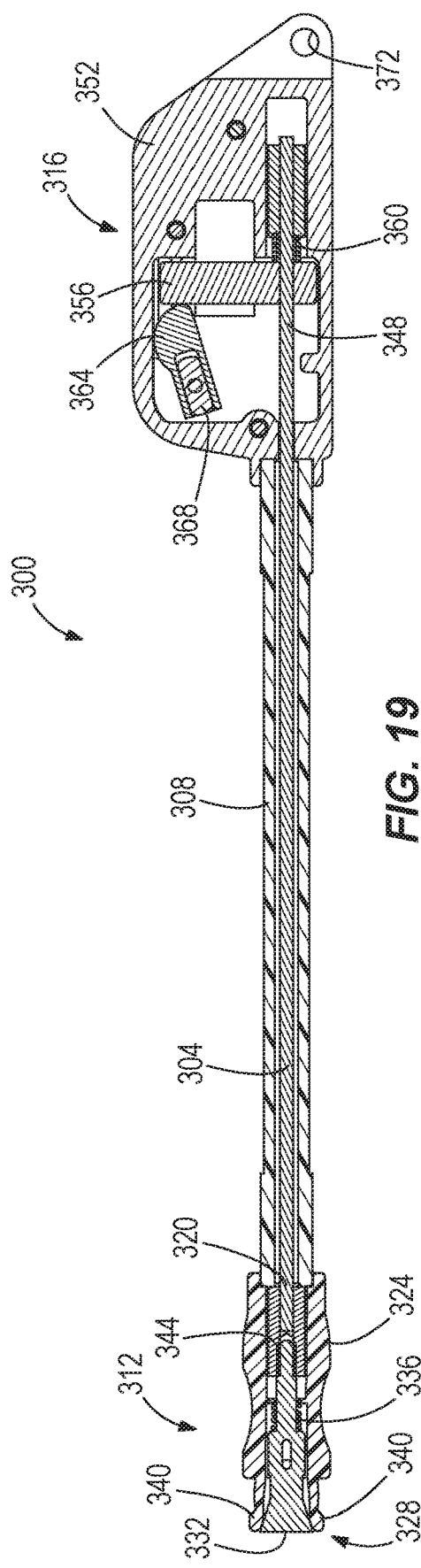

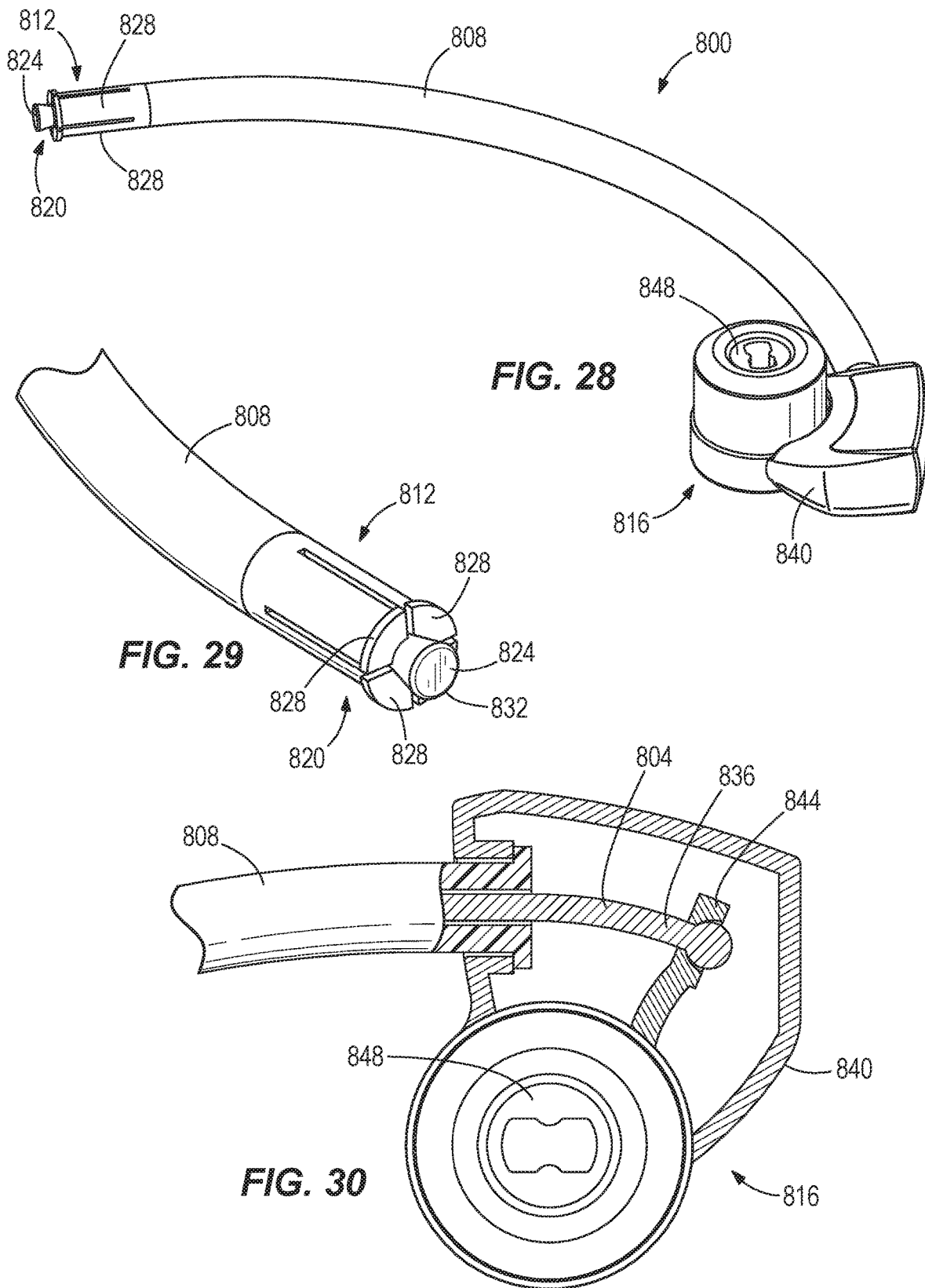

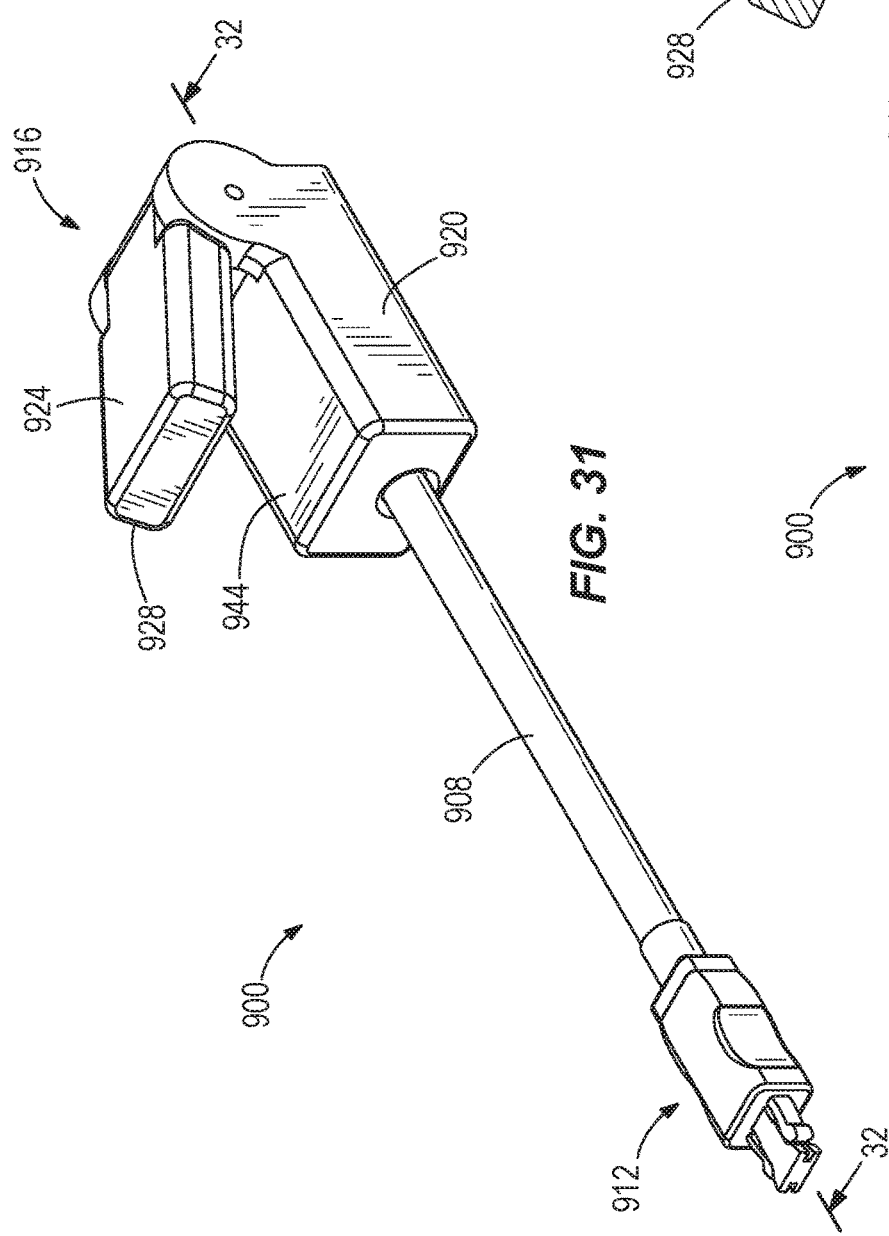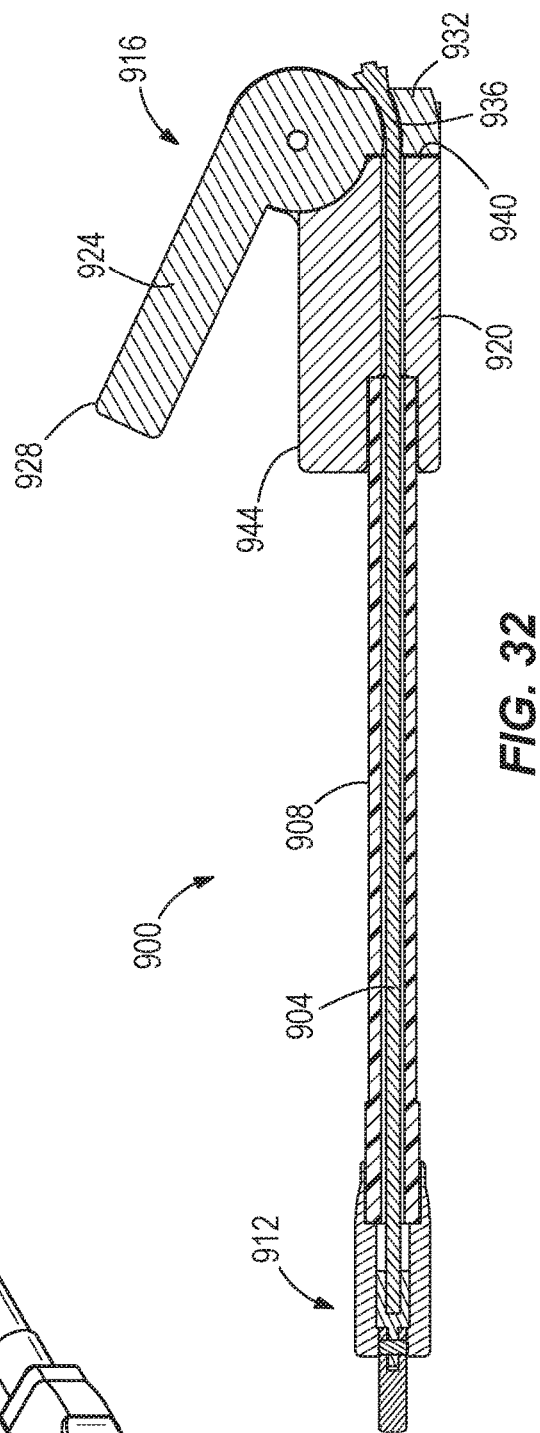

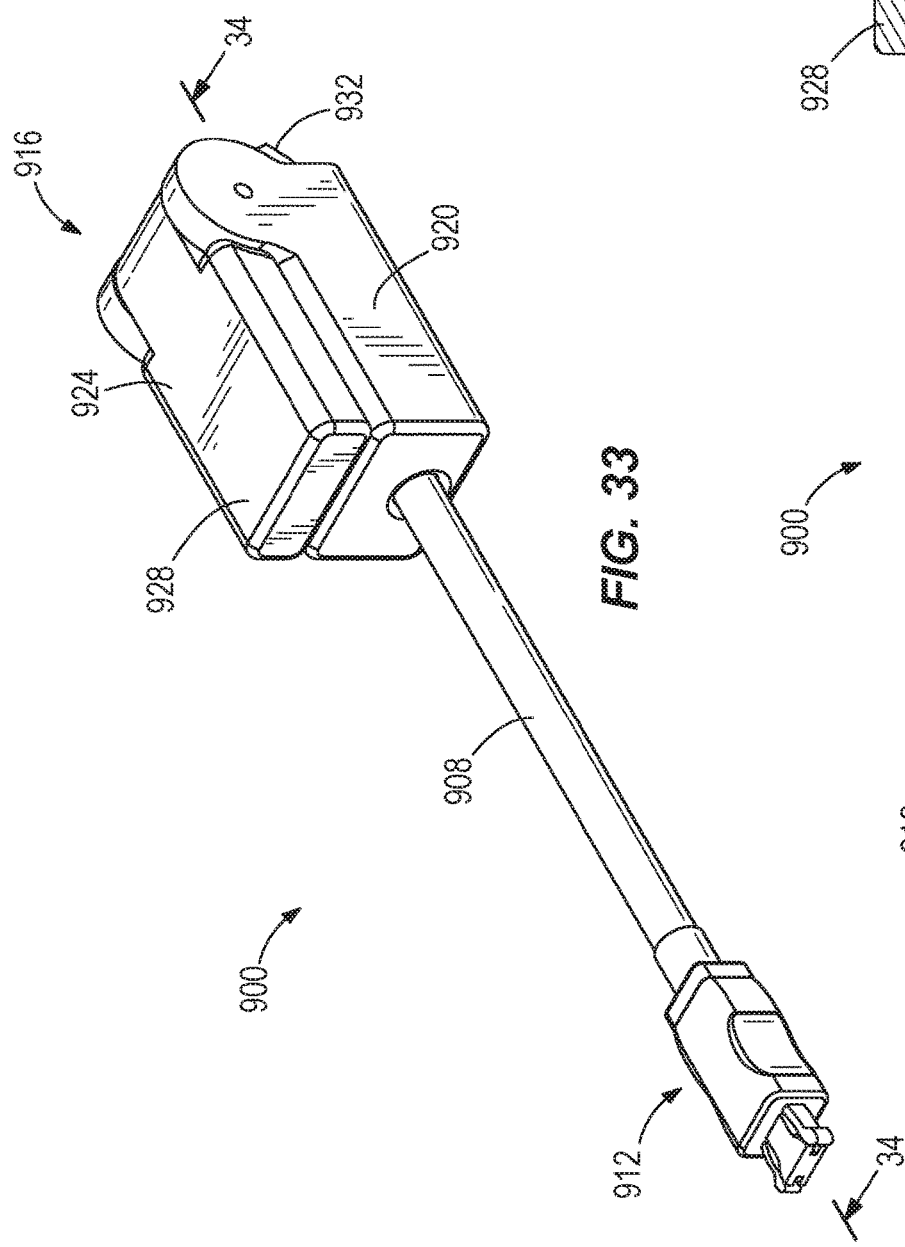
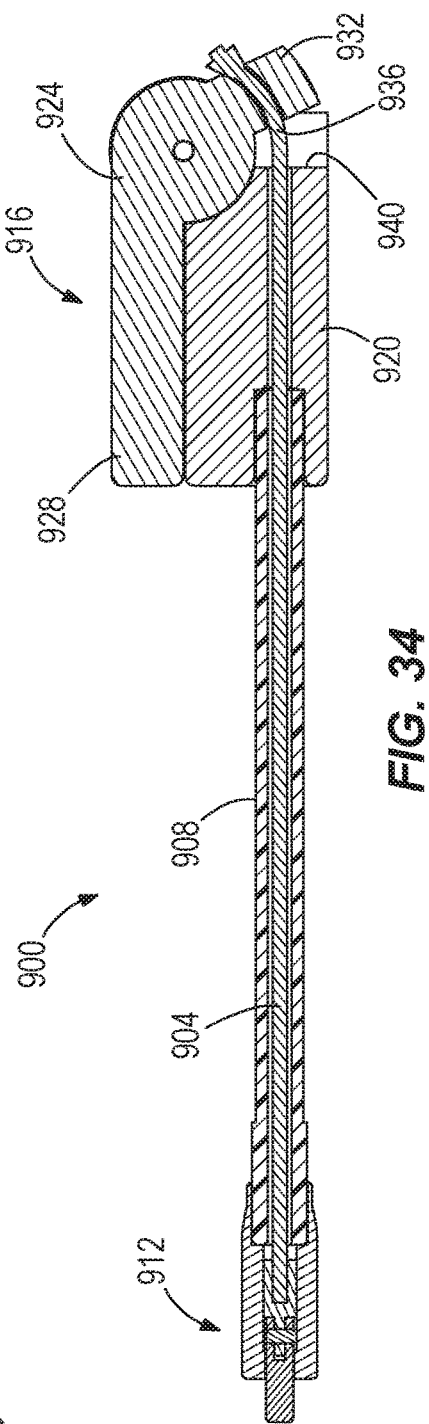
FIG. 33
FIG. 34

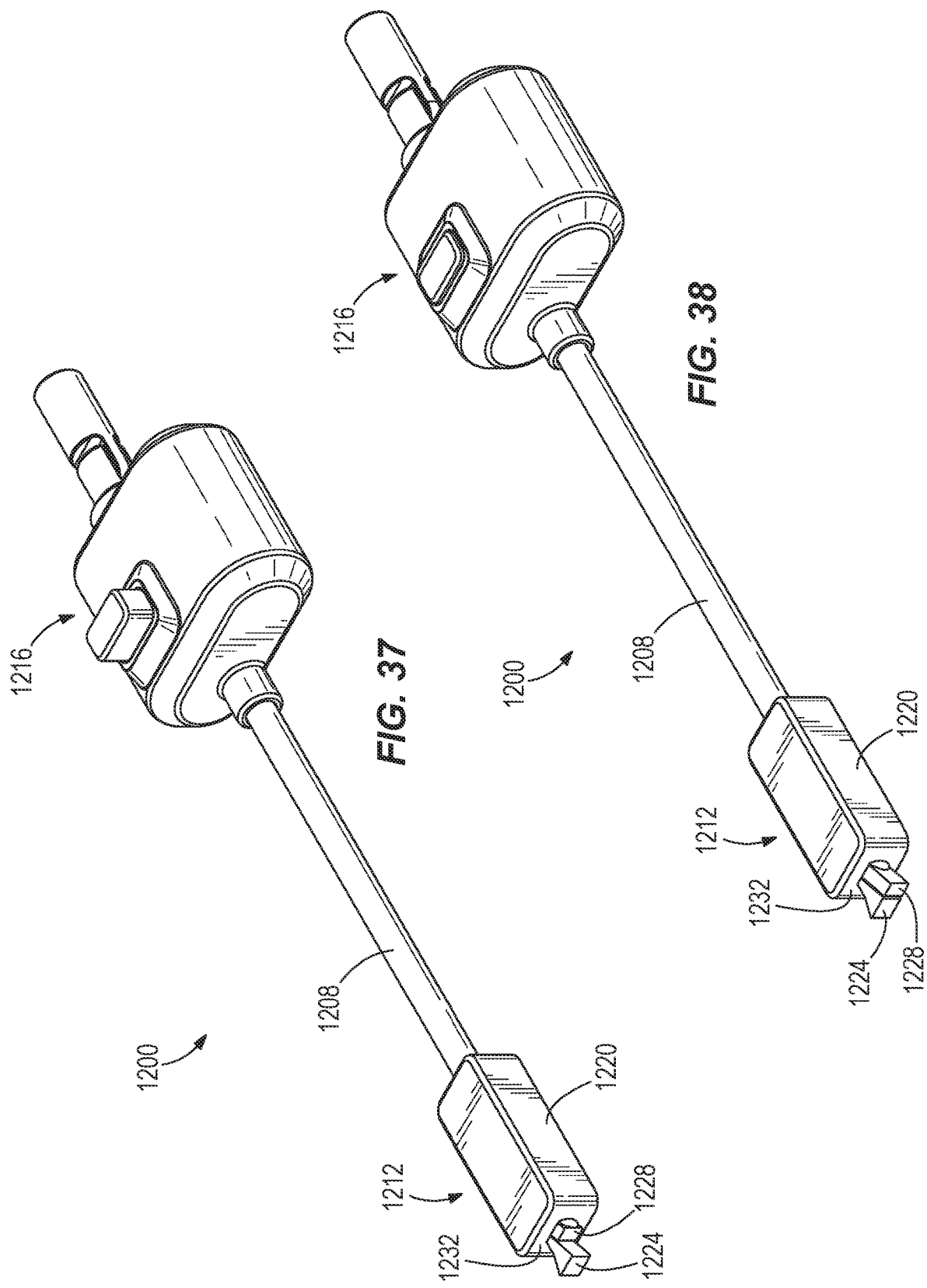

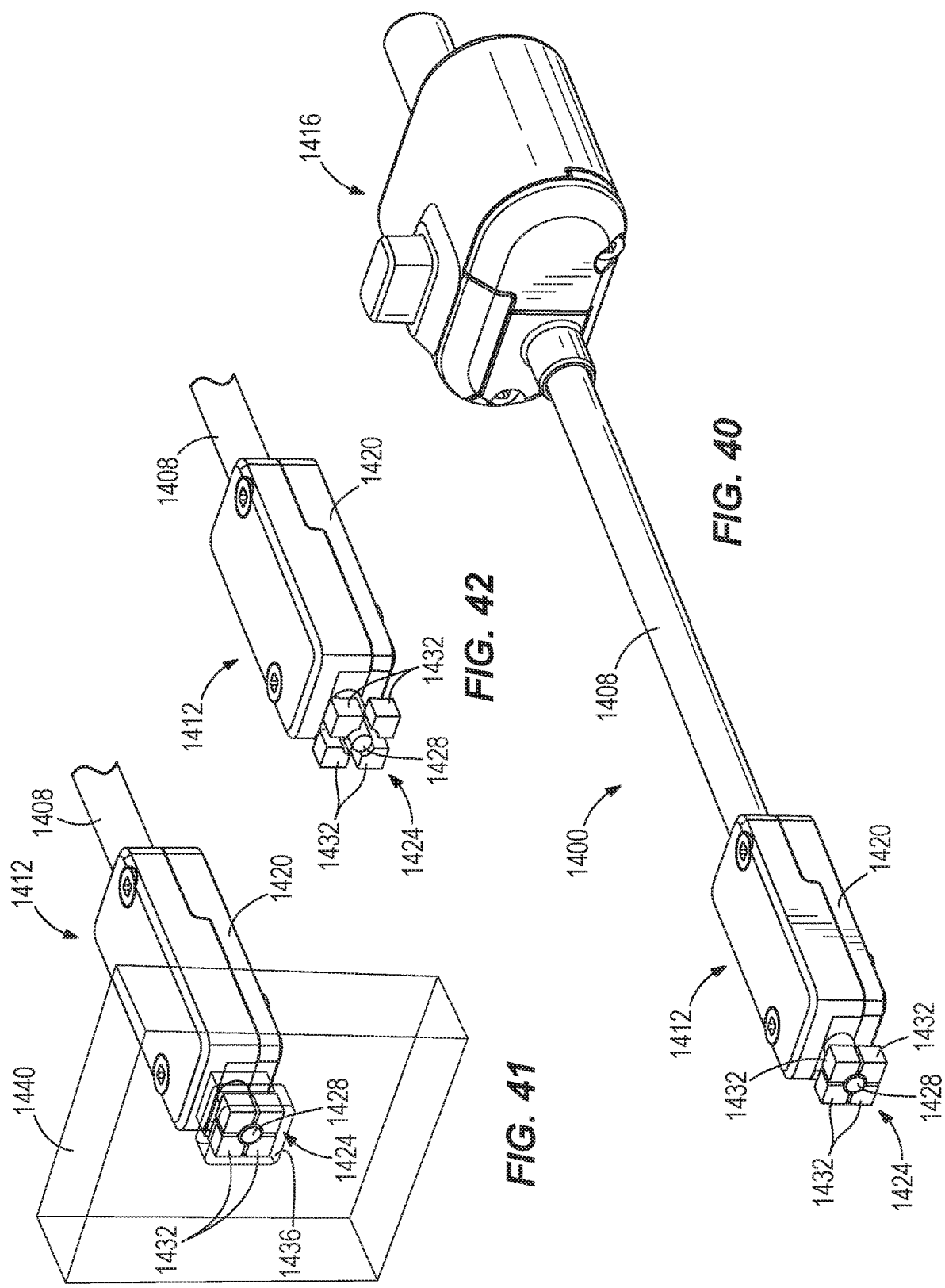

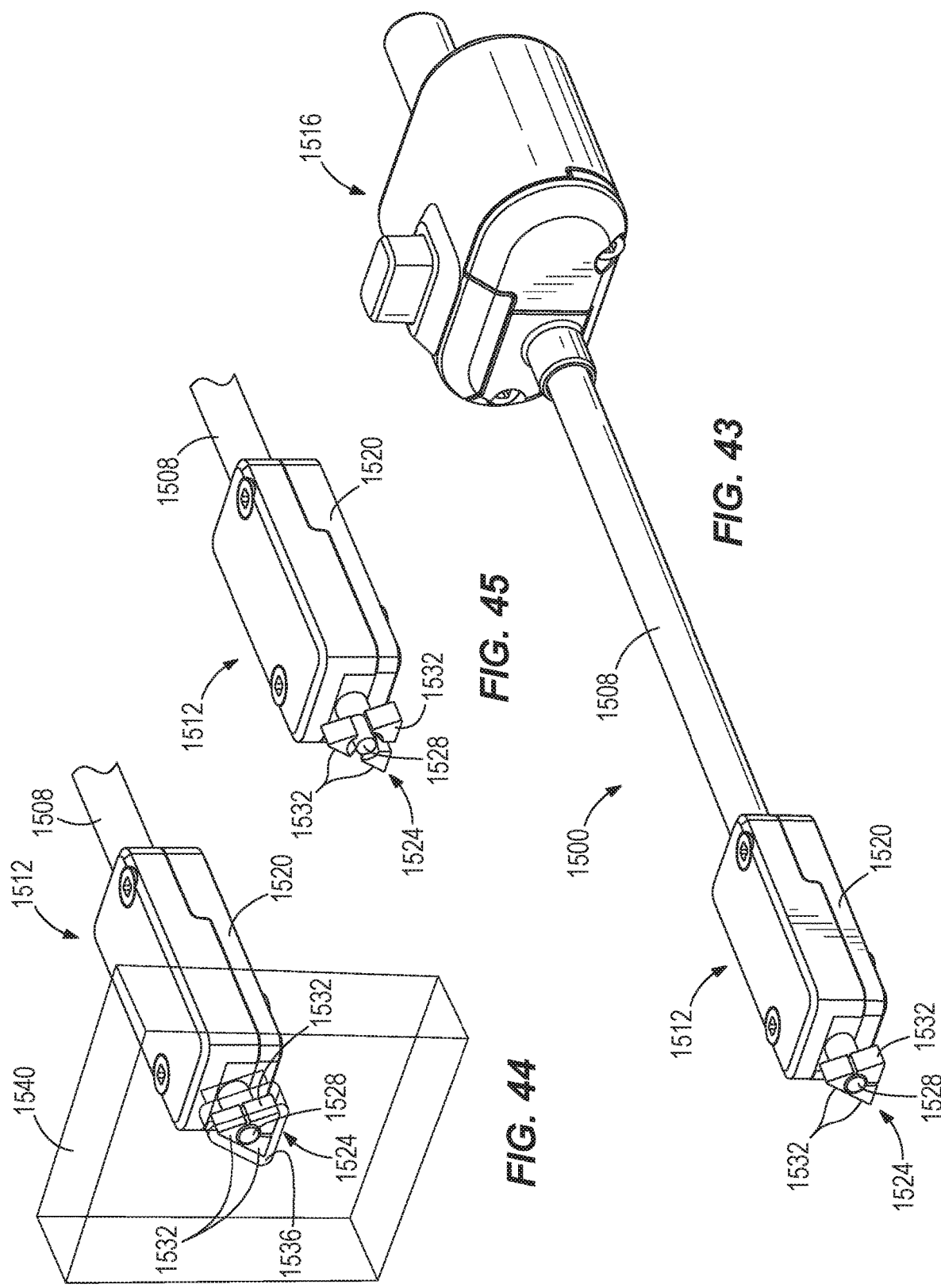

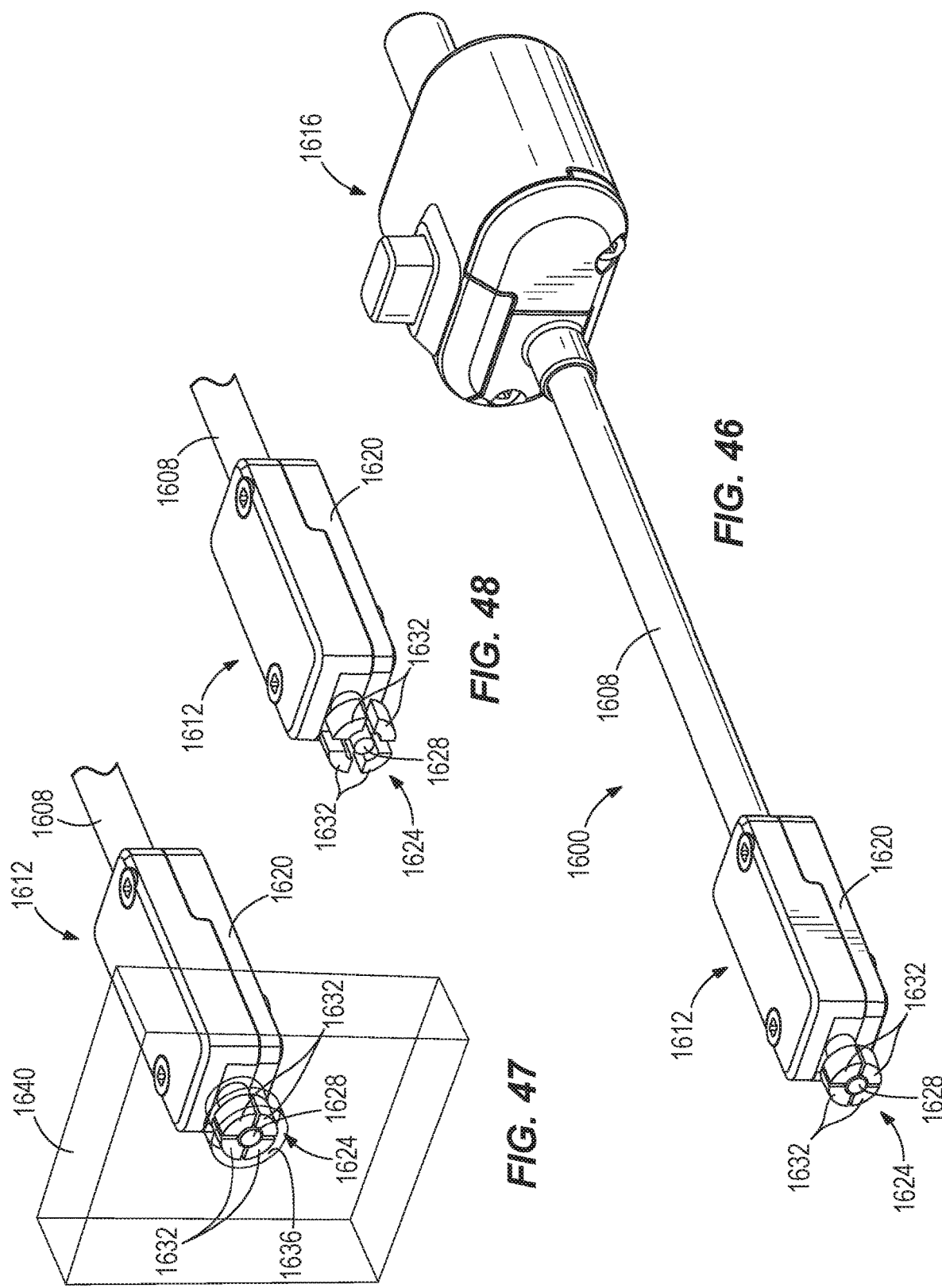

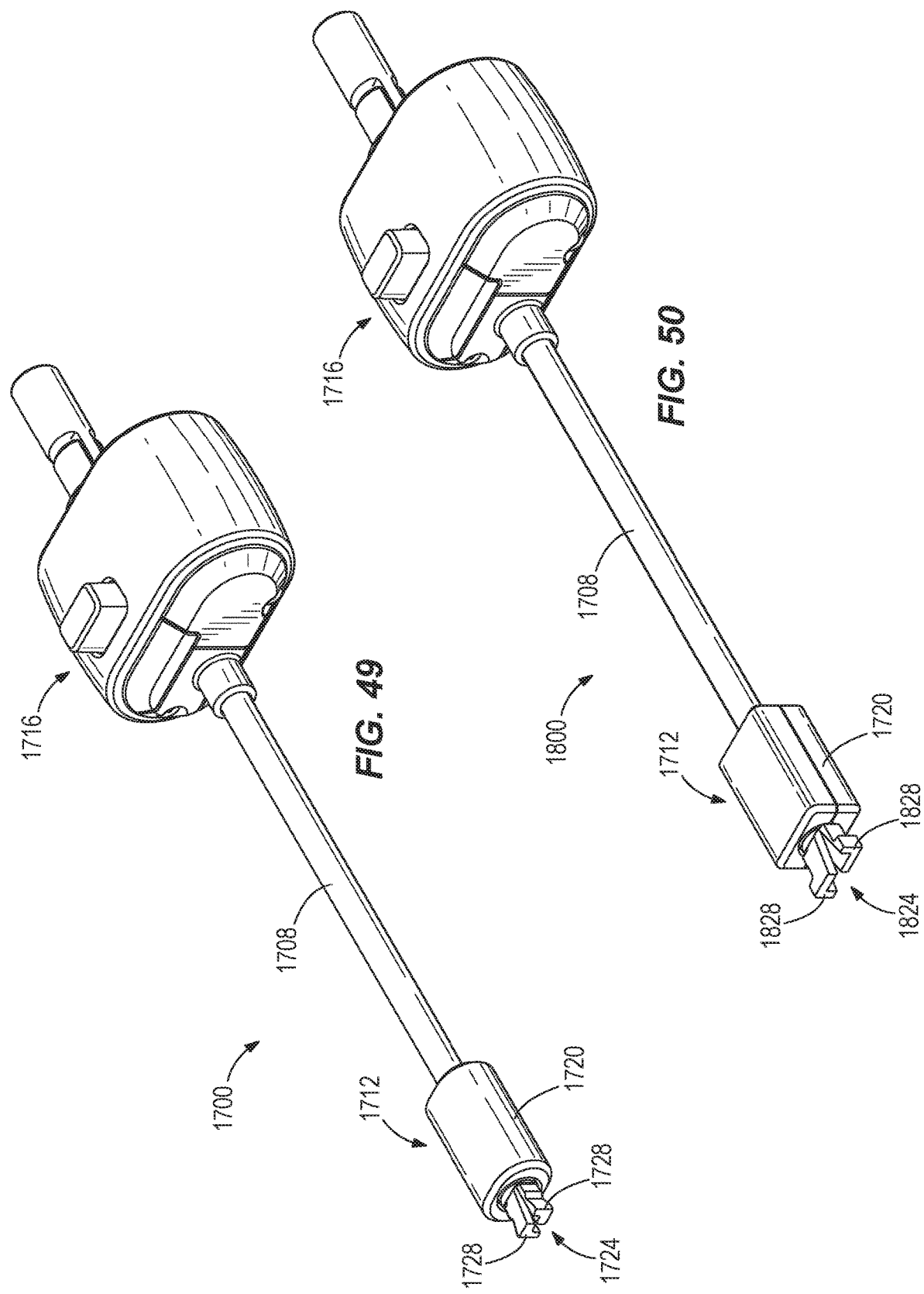

SECURITY APPARATUS INCLUDING A REMOTE ACTUATOR ASSEMBLY

CROSS REFERENCE TO RELATED APPLICATIONS

This application is a continuation of U.S. patent application Ser. No. 16/740,877, filed Jan. 13, 2020, which is a continuation of U.S. patent application Ser. No. 16/120,955, filed Sep. 4, 2018, now U.S. Pat. No. 10,563,432, which is a continuation of U.S. patent application Ser. No. 14/711,914, filed May 14, 2015, now U.S. Pat. No. 10,066,423, which is a continuation of U.S. patent application Ser. No. 14/469,016, filed Aug. 26, 2014, now U.S. Pat. No. 9,062,476, which claims priority to U.S. Provisional Patent Application No. 61/870,964, filed Aug. 28, 2013, and to U.S. Provisional Patent Application No. 61/943,662, filed Feb. 24, 2014, the entire contents of all of which are incorporated by reference herein.

BACKGROUND

The present invention relates to security apparatuses for securing portable electronic devices and, more particularly, to security apparatuses including remote actuator assemblies.

Security apparatuses are commonly used to secure laptop computers, tablet computers, and other portable electronic devices in place. Some security apparatuses are configured to engage and lock in slots formed in the portable electronic devices. These apparatuses, however, may be bulky relative to the slim industrial design of newer devices. As such, the security apparatuses may block other ports (e.g., USB ports, power ports, headphone jacks, etc.) of the portable electronic devices when connected to the devices.

SUMMARY

In one embodiment, the invention provides a security apparatus for a portable electronic device. The security apparatus includes a cable having a length, a first end, and a second end. The security apparatus also includes a lock head coupled to the first end of the cable. The lock head is configured to selectively engage the portable electronic device and is movable by the cable between a first position, in which the lock head is secured to the portable electronic device, and a second position, in which the lock head is unsecured from the portable electronic device. The security apparatus further includes an actuator assembly coupled to the second end of the cable and spaced a distance from the lock head along the length of the cable. The actuator assembly is operable to actuate the cable to move the lock head between the first position and the second position.

In another embodiment, the invention provides a system including a portable electronic device having a housing, a screen supported by the housing, and an attachment member coupled to the housing. The system also includes a security apparatus having a cable with a length, a first end, and a second end. The security apparatus also includes a lock head coupled to the first end of the cable. The lock head engages the attachment member of the portable electronic device and is movable by the cable between a first position, in which the lock head is secured to the portable electronic device, and a second position, in which the lock head is unsecured from the portable electronic device. The security apparatus further includes an actuator assembly coupled to the second end of the cable and spaced a distance from the lock head along the length of the cable. The actuator assembly is operable to actuate the cable to move the lock head between the first position and the second position.

In yet another embodiment, the invention provides a security apparatus for a portable electronic device. The portable electronic device has a slot. The security apparatus includes a cable having a length, a first end, and a second end. The security apparatus also includes a lock head coupled to the first end of the cable. The lock head includes an expandable portion that is configured to be received in the slot of the portable electronic device. The lock head is movable by the cable between a first position, in which the expandable portion expands outward to secure the lock head within the slot of the portable electronic device, and a second position, in which the expandable portion moves radially inward to unsecure the lock head from the slot of the portable electronic device. The security apparatus further includes an actuator assembly coupled to the second end of the cable and configured to be secured to an immovable object. The actuator assembly is operable to pull the cable to move the lock head from the second position to the first position, and is operable to release the cable to move the lock head from the first position to the second position. The security apparatus also includes an outer sheath surrounding at least a portion of the cable and coupled to the lock head and the actuator assembly. The outer sheath maintains a distance of at least 8 cm between the lock head and the actuator assembly along the length of the cable.

In still another embodiment, the invention provides a security apparatus for a portable electronic device. The security apparatus includes a force-transmission member having a first end and a second end that is spaced at least 8 cm from the first end. The security apparatus also includes a lock head coupled to the first end of the force-transmission member. The lock head is configured to selectively engage the portable electronic device and is movable by the force-transmission member between a first position, in which the lock head is secured to the portable electronic device, and a second position, in which the lock head is unsecured from the portable electronic device. The security apparatus further includes an actuator assembly coupled to the second end of the force-transmission member. The actuator assembly is operable to actuate the force-transmission member to move the lock head between the first position and the second position.

In yet still another embodiment, the invention provides a system for securing a portable electronic device. The system includes an enclosure having an outer wall and an opening formed in the outer wall. The system also includes a security apparatus having a force-transmission member extending through the opening of the enclosure and having a first end and a second end. The security apparatus also includes a lock head coupled to the first end of the force-transmission member so that the lock head is outside the enclosure. The lock head is configured to selectively engage the portable electronic device and is movable by the cable between a first position, in which the lock head is secured to the portable electronic device, and a second position, in which the lock head is unsecured from the portable electronic device. The security apparatus further includes an actuator assembly coupled to the second end of the force-transmission member so that the actuator assembly is located inside the enclosure. The actuator assembly is operable to actuate the force-transmission member to move the lock head between the first position and the second position.

In yet still another embodiment, the invention provides a security apparatus for a portable electronic device. The security apparatus includes a force-transmission member having a length, a first end, and a second end. A lock head is coupled to the first end of the force-transmission member, the lock head configured to selectively engage the portable electronic device and movable by the force-transmission member between a locked position, in which the lock head is secured to the portable electronic device, and an unlocked position, in which the lock head is unsecured from the portable electronic device. An actuator assembly is spaced a distance from the lock head along the length of the force-transmission member. The actuator assembly includes a body and a manual actuator pivotally coupled to the body, the manual actuator being pivotable from a first position to a second position to move the movable member relative to the body such that the lock head moves from the unlocked position to the locked position.

Other aspects of the invention will become apparent by consideration of the detailed description and accompanying drawings.

BRIEF DESCRIPTION OF THE DRAWINGS

FIG. 14 is an exploded perspective view of the security apparatus of FIG. 1 including a customizable housing assembly.

FIG. 15 is an exploded perspective view of the security apparatus of FIG. 1 including another customizable housing assembly.

FIG. 18 is a cross-sectional view of the security apparatus taken along section line 18-18 of FIG. 17, with the security apparatus in an unlocked position.

FIG. 19 is a cross-sectional view of the security apparatus taken along section line 18-18 of FIG. 17, with the security apparatus in a locked position.

FIG. 28 is a perspective view of another security apparatus embodying the invention.

FIG. 29 is an enlarged perspective view of a locking head of the security apparatus of FIG. 28.

FIG. 30 is an enlarged, partial cross-sectional view of an actuator assembly of the security apparatus of FIG. 28.

FIG. 31 is a perspective view of another security apparatus embodying the invention, the security apparatus in an unlocked position.

FIG. 32 is a cross-sectional view of the security apparatus taken along section line 32-32 of FIG. 31.

FIG. 33 is a perspective view of the security apparatus of FIG. 31 when in a locked position.

FIG. 34 is a cross-sectional view of the security apparatus taken along section line 34-34 of FIG. 33.

FIG. 37 is a perspective view of another security apparatus embodying the invention, the security apparatus in an unlocked position.

FIG. 38 is a perspective view of the security apparatus of FIG. 37 in a locked position.

FIG. 40 is a perspective view of another security apparatus embodying the invention.

FIG. 41 illustrates a locking head of the security apparatus of FIG. 40 when in an unlocked position.

FIG. 42 illustrates the locking head of the security apparatus of FIG. 40 when in a locked position.

FIG. 43 is a perspective view of another security apparatus embodying the invention.

FIG. 44 illustrates a locking head of the security apparatus of FIG. 43 when in an unlocked position.

FIG. 45 illustrates the locking head of the security apparatus of FIG. 43 when in a locked position.

FIG. 46 is a perspective view of another security apparatus embodying the invention.

FIG. 47 illustrates a locking head of the security apparatus of FIG. 46 when in an unlocked position.

FIG. 48 illustrates the locking head of the security apparatus of FIG. 46 when in a locked position.

FIG. 49 is a perspective view of another security apparatus embodying the invention.

FIG. 50 is a perspective view of another security apparatus embodying the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
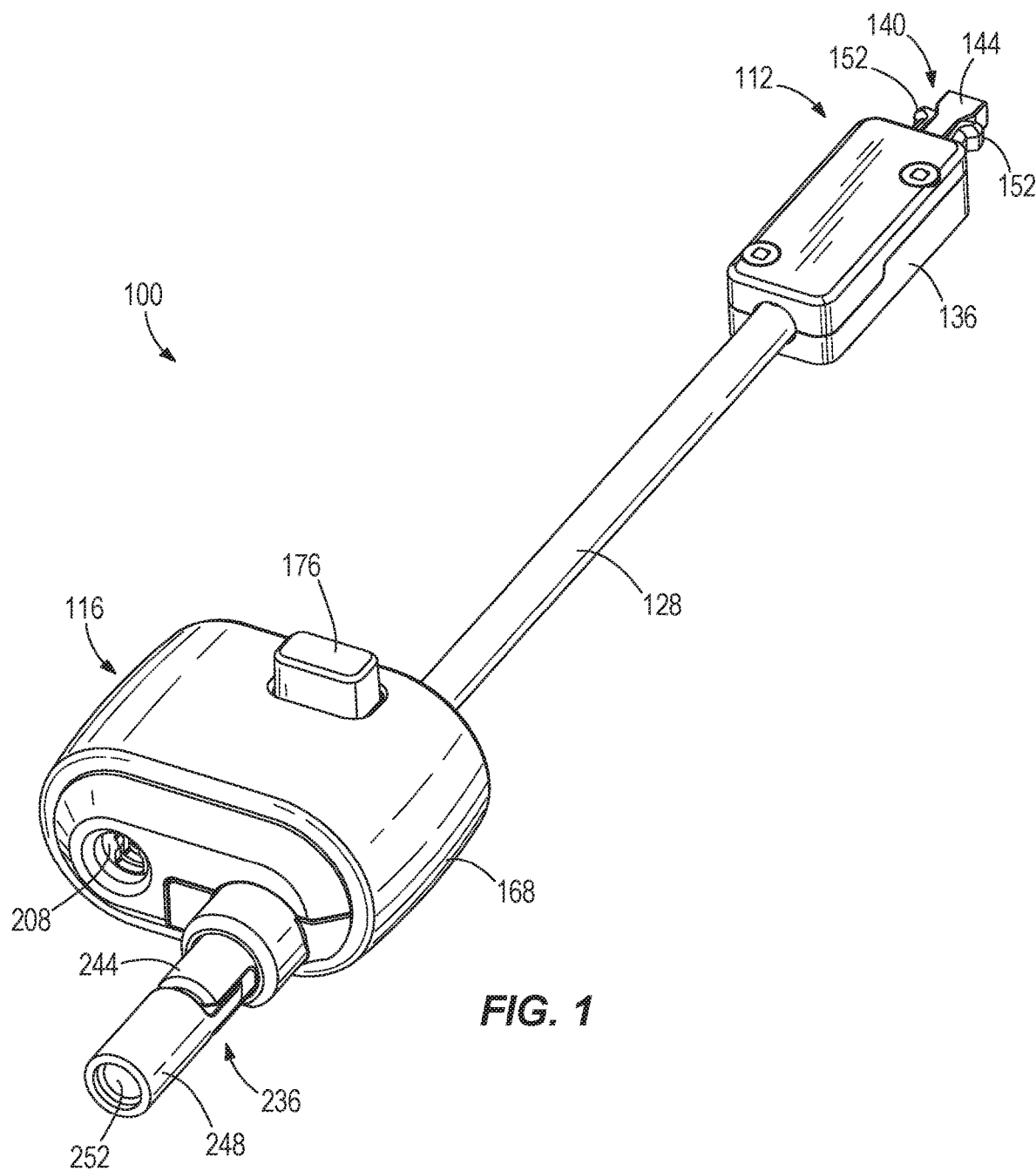
FIG. 1 is a perspective view of a security apparatus embodying the invention, the security apparatus including a lock head and an actuator assembly.
Figure 2:
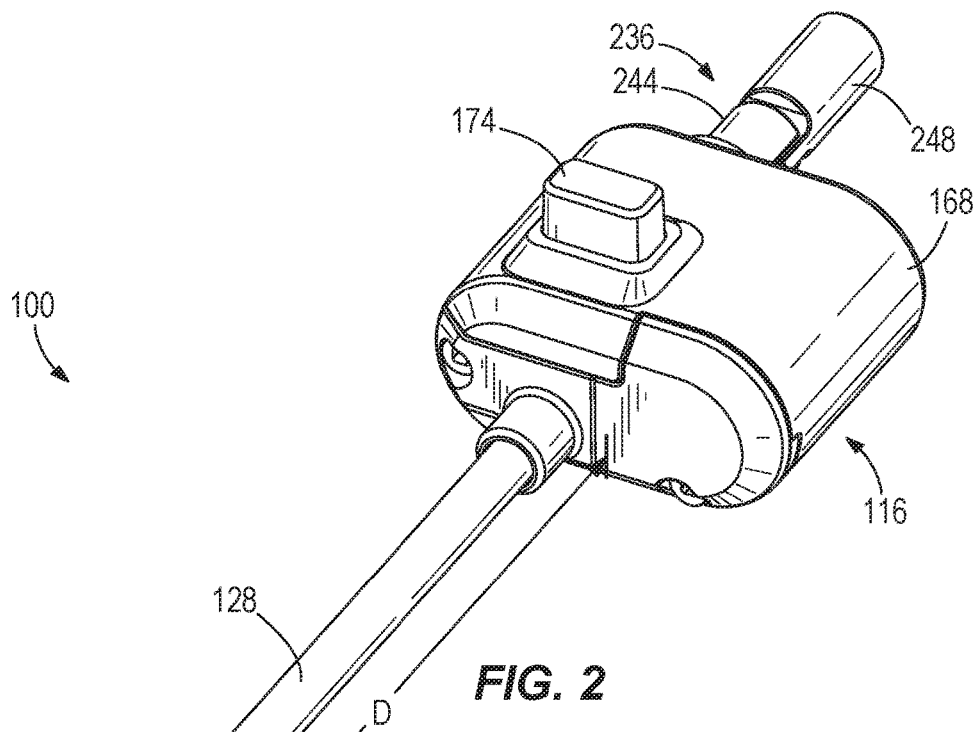
FIG. 2 is another perspective view of the security apparatus of FIG. 1.

FIGS. 1 and 2 illustrate a security apparatus 100 embodying the invention. The security apparatus 100 is configured to engage a portable electronic device 104 (FIG. 16) (e.g., a tablet computer, a laptop computer, a smartphone, an mp3 player, an eReader, etc.) to secure the portable electronic device 104 at a location. The illustrated security apparatus 100 includes a force-transmission member 108 (FIGS. 3-7), a lock head 112, and an actuator assembly 116. The lock head 112 and the actuator assembly 116 are coupled to opposite ends of the force-transmission member 108 so that the actuator assembly 116 is located remote from the lock head 112. This arrangement positions the actuator assembly 116 apart from the portable electronic device 104 so the actuator assembly 116 does not interfere with and/or block other ports, buttons, or sections of the portable electronic device 104.

As shown in FIGS. 3-7, the illustrated force-transmission member 108 is a cable having a length, a first end 120, and a second end 124. The lock head 112 (FIGS. 3-5) is coupled to the first end 120 of the cable 108. The actuator assembly 116 (FIGS. 6-7) is coupled to the second end 124 of the cable 108. As used herein, "end" refers to the portion of the cable 108 that is received in and coupled to the lock head 112 or the actuator assembly 116, and not necessarily to the absolute terminus of the cable 108. Connecting the lock head 112 and the actuator assembly 116 to opposite ends of the cable 108 spaces the actuator assembly 116 a distance D (FIG. 2) from the lock head 112. The distance D is measured along the length of the cable 108 and is not necessarily the shortest distance between the lock head 112 and the actuator assembly 116. In addition, the distance D is fixed in that even though the cable 108 may bend, the cable 108 does not compress. As such, the distance D between the lock head 112 and the actuator assembly 116, when measured along the length of the cable 108, remains constant.

An outer sheath 128 surrounds the cable 108 to protect and strengthen the cable 108. The outer sheath 128 maintains the lock head 112 at the distance D, along the length of the cable 108, from the actuator assembly 116. The cable 108 is movable relative to the outer sheath 128 to move and actuate the lock head 112. In the illustrated embodiment, the cable 108 slides within the outer sheath 128. The cable 108 and the outer sheath 128 are also flexible to allow the lock head 112 and the actuator assembly 116 to move relative to each other, yet still retain the distance D between the lock head 112 and the actuator assembly 116. In other embodiments, the cable 108 and/or the outer sheath 128 may be rigid structures that do not bend or flex. In some embodiments, the distance D between the lock head 112 and the actuator assembly 116 is at least 8 cm. In other embodiments, the distance D may be longer or shorter (e.g., 5 cm, 10 cm, 1 m, etc.), depending on the desired application or use of the security apparatus 100.

Figure 3:
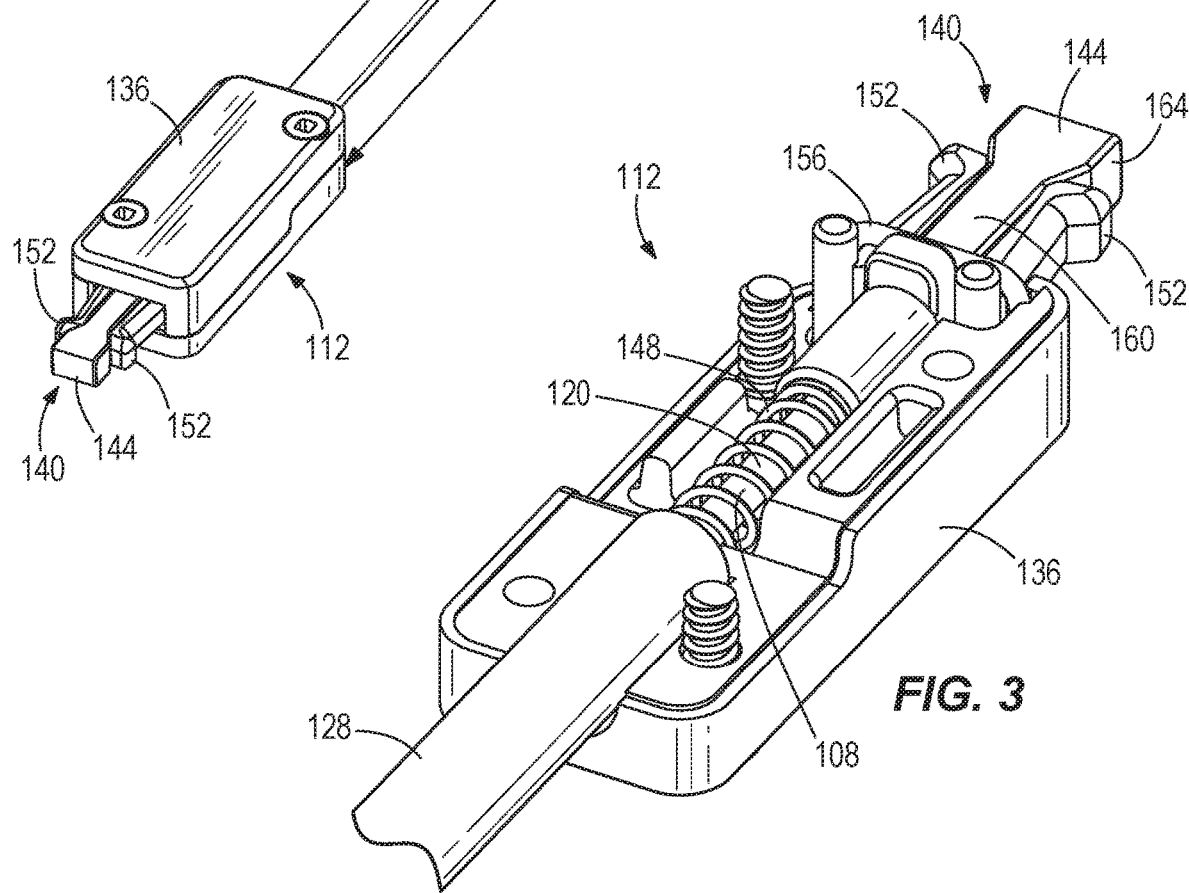
FIG. 3 is an enlarged perspective view of the lock head of the security apparatus of FIG. 1, with a portion of a body removed.
Figure 5:
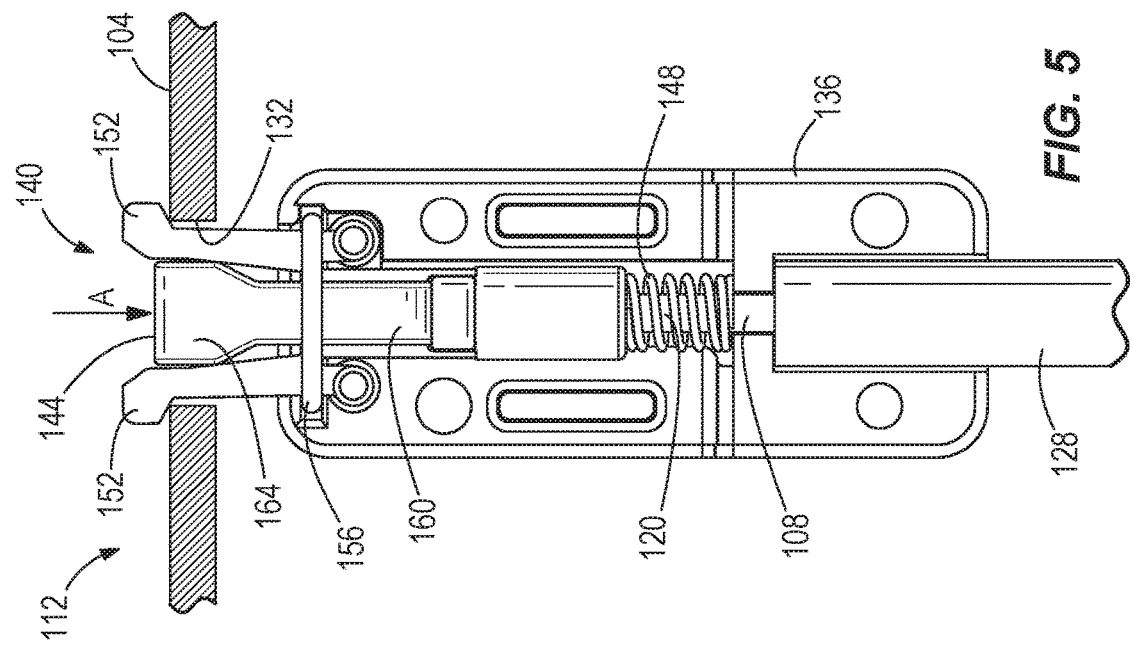
FIG. 5 is an enlarged plan view of the lock head of the security apparatus of FIG. 1 when in a locked position, with the portion of the body removed.
Figure 4:
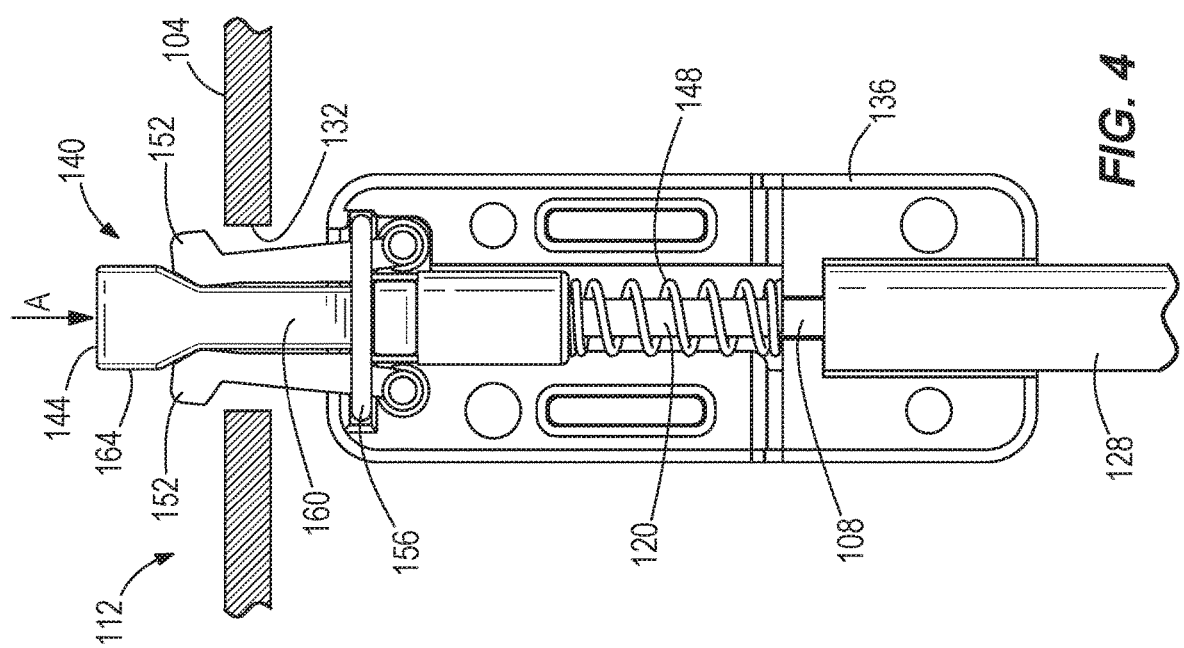
FIG. 4 is an enlarged plan view of the lock head of the security apparatus of FIG. 1 when in an unlocked position, with the portion of the body removed.

As shown in FIGS. 3-5, the lock head 112 is coupled to the first end 120 of the cable 108. At least a portion of the lock head 112 is configured to be received in an opening or slot 132 formed in the portable electronic device 104. When positioned within the slot 132, the lock head 112 selectively engages the portable electronic device 104 to secure the security apparatus 100 to the device 104. In particular, the lock head 112 is movable between a first, unlocked position (FIG. 4) and a second, locked position (FIG. 5).

The illustrated lock head 112 includes a body 136, an expandable portion 140, a plunger 144, and a biasing member 148. A portion of the body 136 is removed in FIGS. 3-5 to help illustrate the internal components of the lock head 112. The body 136 receives a portion of the outer sheath 128 that is adjacent the first end 120 of the cable 108 to fix the lock head 112 to the sheath 128. In some embodiments, the outer sheath 128 may be clamped and/or glued within the body 136. The body 136 also houses and supports the other components of the lock head 112.

The expandable portion 140 is coupled to and extends outwardly from the body 136. In the illustrated embodiment, the expandable portion 140 extends axially from the body 136 and is generally aligned with a longitudinal axis of the cable 108 when the cable 108 is straightened. The illustrated expandable portion 140 includes two spaced apart latches 152. The latches 152, or tabs or fingers, are movable relative to the body 136 between the unlocked position (FIG. 4) and the locked position (FIG. 5). An elastomeric element 156 (e.g., an O-ring or rubber band) surrounds the latches 152 to help bias the latches 152 toward the unlocked position. The elastomeric element 156 also seals an end of the body 136. When in the unlocked position, the latches 152 are positioned radially inward so that the latches 152 are spaced apart from and disengage the portable electronic device 104. In this position, the lock head 112 can be inserted into and removed from the slot 132 in the device 104. When in the locked position, the latches 152 are moved (e.g., pivoted) away from each other and radially outward relative to the body 136. In this position, the latches 152 engage the portable electronic device 104 to secure the lock head 112 to the device 104. In other embodiments, the expandable portion 140 may include other types or configuration of latches suitable for engaging the portable electronic device 104. For example, in some embodiments, the expandable portion 140 may include latches that are at least partially composed of a resilient material so that the latches are naturally biased toward the unlocked position (e.g., toward each other). Additionally or alternatively, the expandable portion 140 may include three or more latches or only a single latch that engages the device 104.

The illustrated plunger 144, or wedge, is positioned partially within the body 136 and between the latches 152 of the expandable portion 140. In the illustrated embodiment, the plunger 144 includes a tapered or narrow portion 160 and a flared or wide portion 164. The tapered portion 160 of the plunger 144 is coupled to the first end 120 of the cable 108. The flared portion 164 of the plunger 144 is the distal, free end of the plunger 144. In operation, the cable 108 pulls the plunger 144 in the direction of arrow A when actuated by the actuator assembly 116 to move the lock head 112 from the unlocked position to the locked position. When the lock head 112 is in the unlocked position (FIG. 4), the tapered portion 160 of the plunger 144 is aligned with the latches 152 so that the latches 152 are biased radially inward by the elastomeric element 156. When the lock head 112 is in the locked position (FIG. 5), the flared portion 164 is aligned with and engages the latches 152 to push the latches 152 radially outward.

The biasing member 148 is positioned within the body 136 and coupled to the plunger 144. The biasing member 148 biases the plunger 144 toward the unlocked position (i.e., in the direction opposite the arrow A) so that the tapered portion 160 of the plunger 144 is aligned with the latches 152. In the illustrated embodiment, the biasing member 148 is a coil spring that is wrapped around the first end 120 of the cable 108. In other embodiments, other suitable biasing members may also or alternatively be employed.

Figure 6:
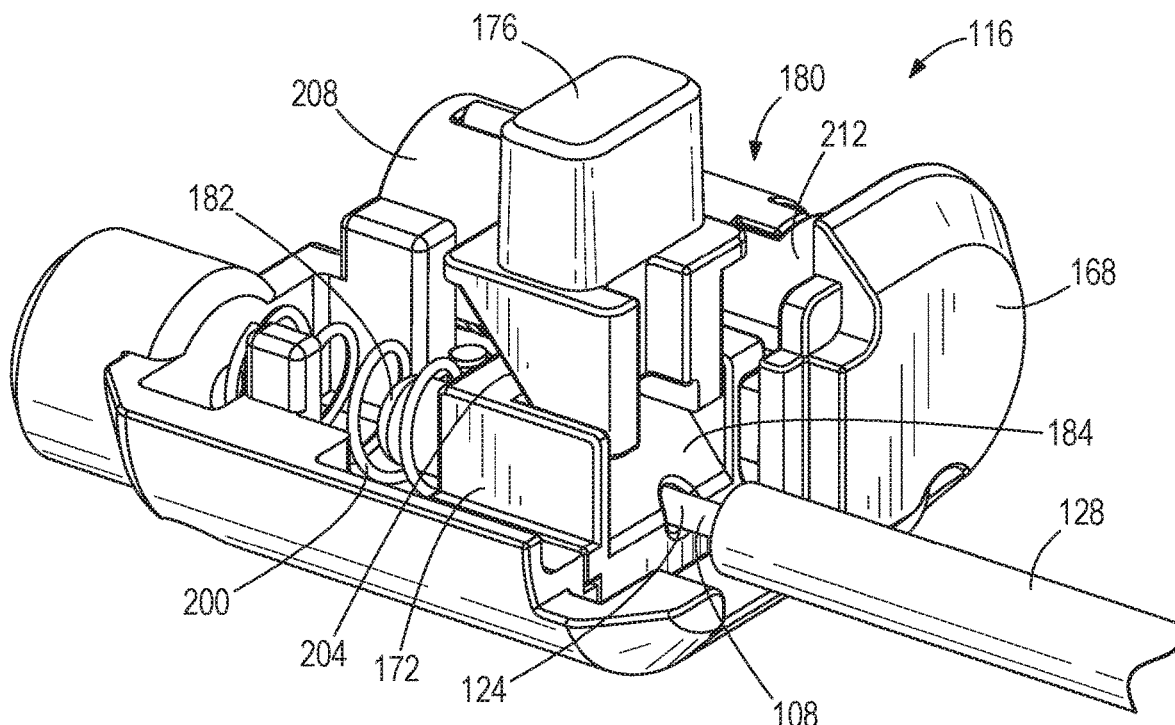
FIG. 6 is an enlarged perspective view of the actuator assembly of the security apparatus of FIG. 1 when in the unlocked position, with a portion of a body removed.
Figure 7:
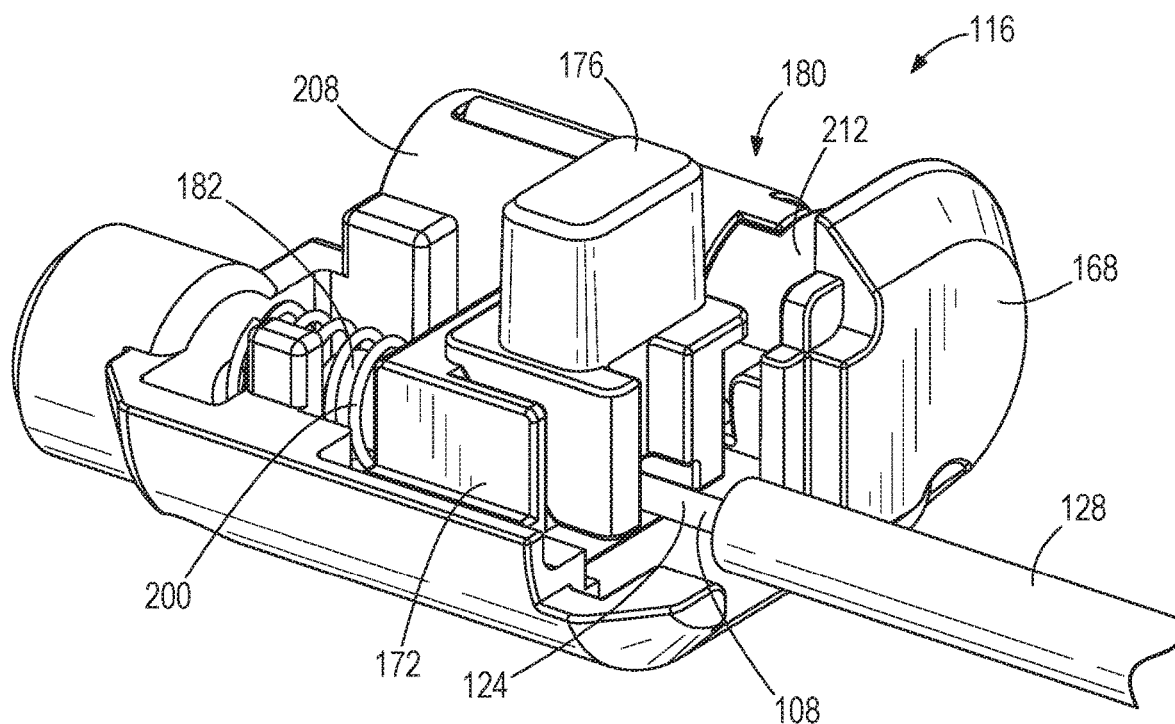
FIG. 7 is an enlarged perspective view of the actuator assembly of the security apparatus of FIG. 1 when in the locked position, with the portion of the body removed.

As shown in FIGS. 6 and 7, the actuator assembly 116 is coupled to the second end 124 of the cable 108. The actuator assembly 116 is operable to actuate (e.g., pull) the cable 108 to move the lock head 112 between the unlocked position and the locked position. The illustrated actuator assembly 116 includes a body 168, a movable member 172, a manual actuator 176, and a lock mechanism 180. A portion of the body 168, or frame, is removed in FIGS. 6 and 7 to facilitate illustration of the internal components of the actuator assembly 116. The body 168 receives a portion of the outer sheath 128 adjacent the second end 124 of the cable 108 to fix the actuator assembly 116 to the sheath 128. In some embodiments, the outer sheath 128 may be clamped and/or glued within the body 168. The body 168 houses and supports the other components of the actuator assembly 116.

Figure 8A:
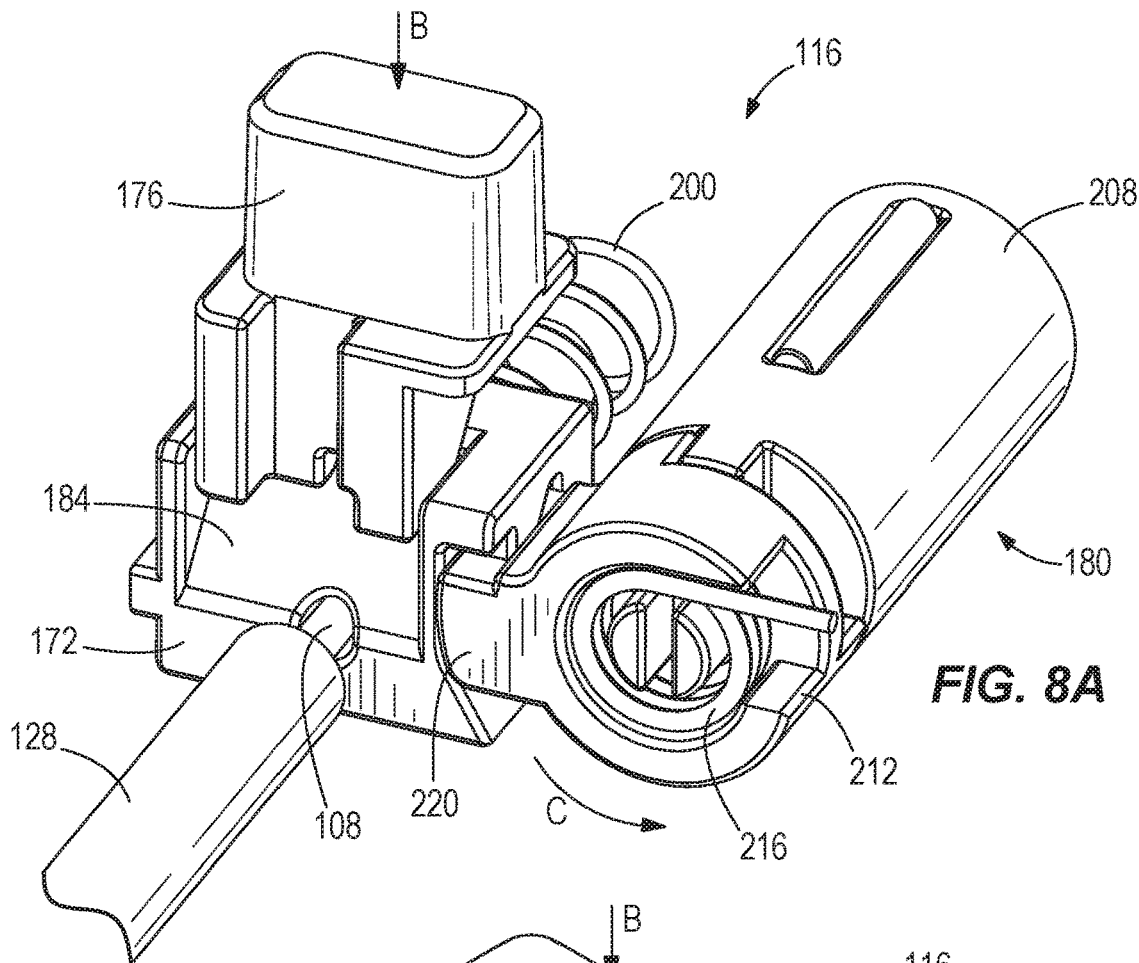
FIGS. 8A and 8B are enlarged perspective views of portions of the actuator assembly of the security apparatus of FIG. 1 when in the unlocked position, with the body removed.
Figure 8B:
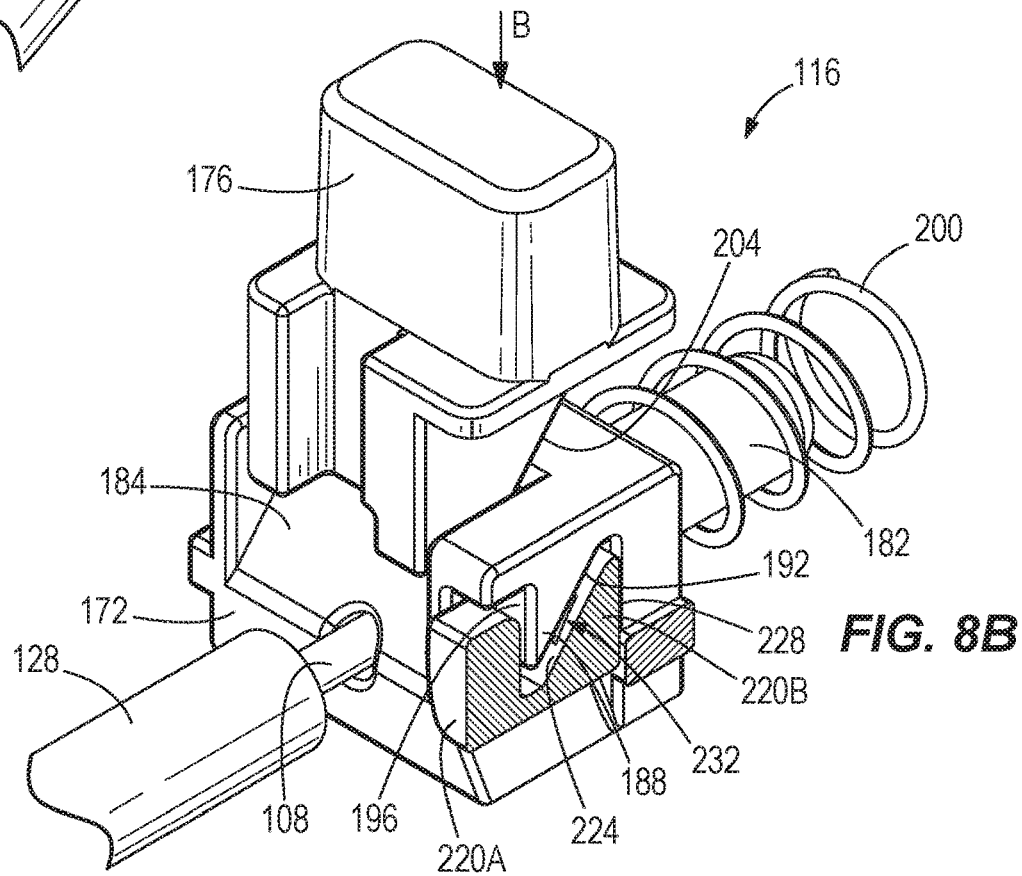

The movable member 172 is positioned within the body 168 and coupled to the second end 124 of the cable 108 by a ferrule 182. The ferrule 182 is secured to the cable 108 and abuts the movable member 172 such that movement of the member 172 also moves the ferrule 182 and the cable 108. The illustrated movable member 172 is a ramp including a first inclined or ramped surface 184 that cooperates with the manual actuator 176. As shown in FIGS. 8A and 8B, the movable member 172 also includes a projection 188, or tooth, having an inclined or ramped surface 192 and a stop surface 196 that cooperate with the lock mechanism 180. In the illustrated embodiment, the first ramped surface 184 is formed in an upper surface of the movable member 172, and the second ramped surface 192 and the stop surface 196 are formed in a side of the movable member 172. The movable member 172 is movable within the body 168 to selectively pull and release the cable 108. When the movable member 172 pulls the cable 108, the cable 108 in turn pulls the plunger 144 (FIGS. 4 and 5) to move the lock head 112 to the locked position. When the movable member 172 releases the cable 108, slack is created in the cable 108 so that a biasing member 200 biases the movable member 172 toward the lock head 112. In the illustrated embodiment, the biasing member 200 is a coil spring that surrounds a portion of the cable 108. In other embodiments, other suitable types of biasing members may also or alternatively be employed.

Referring back to FIGS. 6 and 7, the manual actuator 176 is supported by and extends out of the body 168. In the illustrated embodiment, the actuator 176 is a push button that is depressible by a user to move the actuator 176 relative to the body 168. In other embodiments, other suitable actuators (e.g., levers, dials, etc.) may also or alternatively be employed. The actuator 176 includes an inclined or ramped surface 204 that engages the first ramped surface 184 of the movable member 172. The actuator 176 is movable between a first, extended position (FIGS. 6 and 8A-8B) and a second, depressed position (FIGS. 7 and 9A-10B). When in the first position, the actuator 176 is fully extended from the body 168. In this position, the movable member 172 can move toward the lock head 112 under the force from the biasing member 200, thereby releasing the cable 108 so that the lock head 112 is movable to the unlocked position. When in the second position, the actuator 176 is depressed relative to the body 168. In this position, the movable member 172 is pushed away from the lock head 112 against the force from the biasing member 200, thereby pulling the cable 108 to move the lock head 112 to the locked position.

Figure 9A:
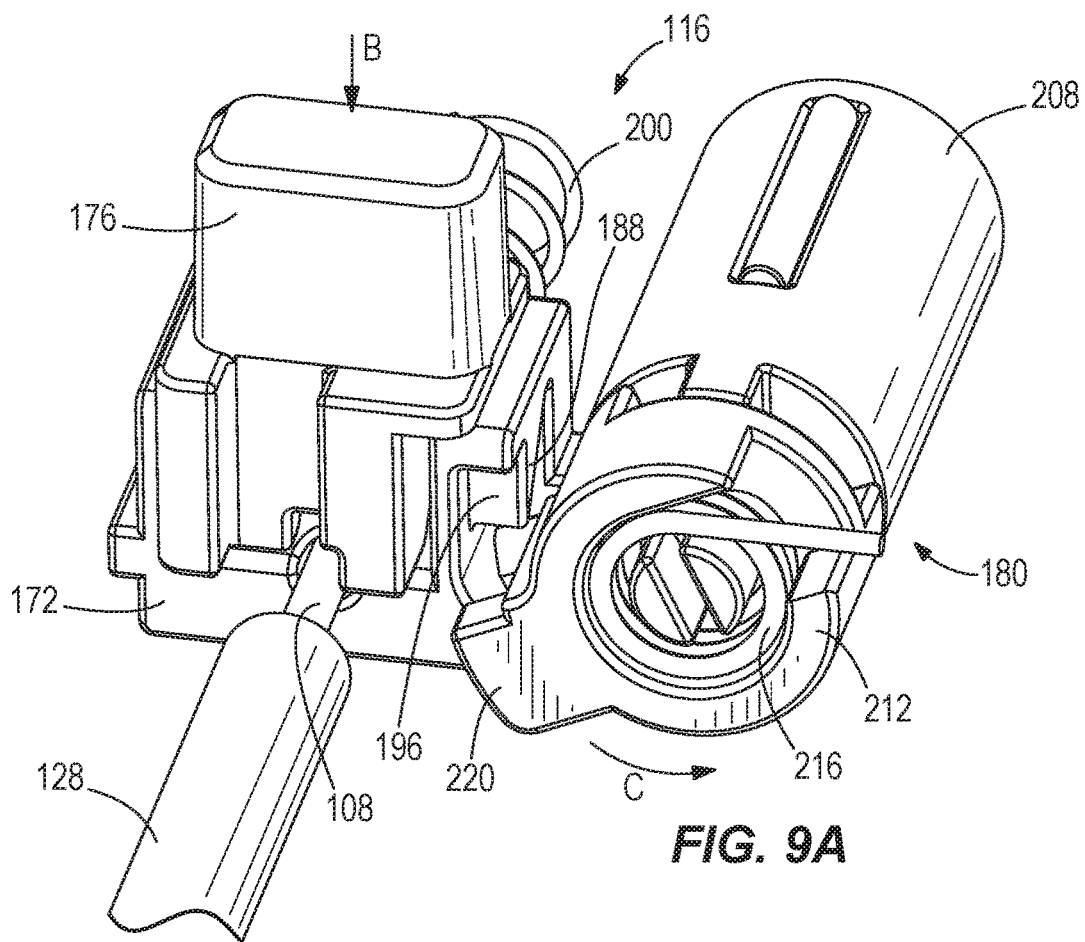
FIGS. 9A and 9B are enlarged perspective views of portions of the actuator assembly of the security apparatus of FIG. 1 when in a released position, with the body removed.
Figure 9B:
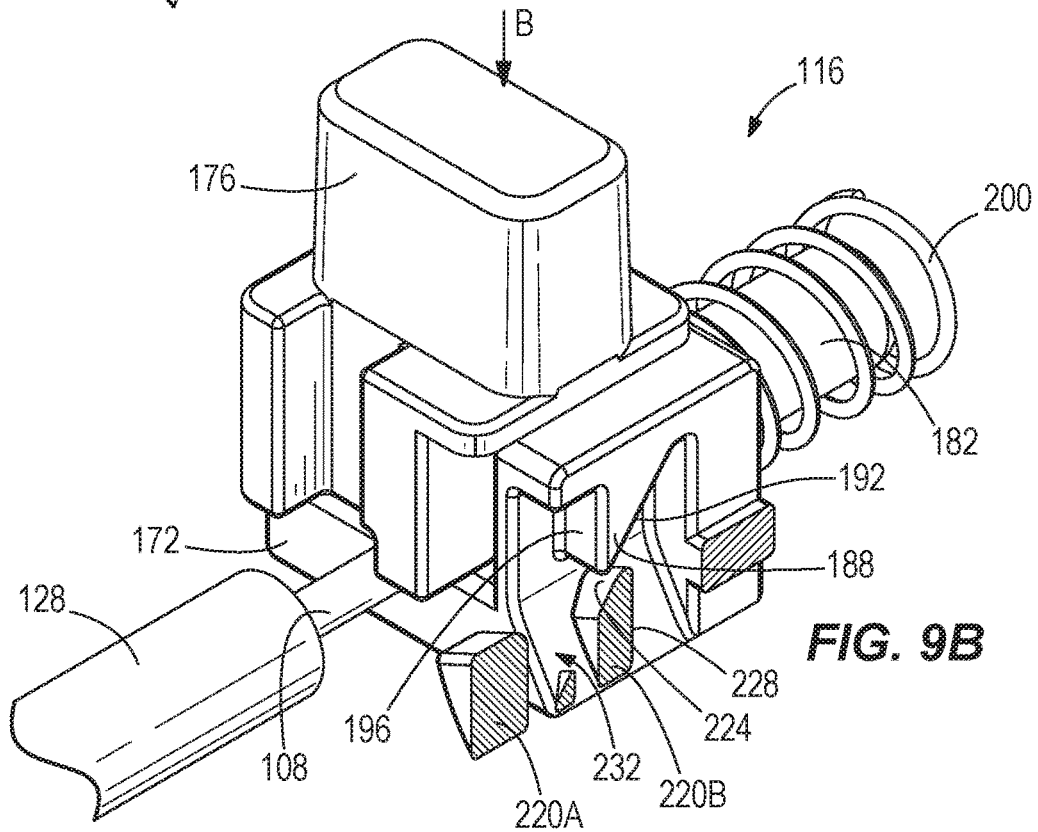
Figure 10A:
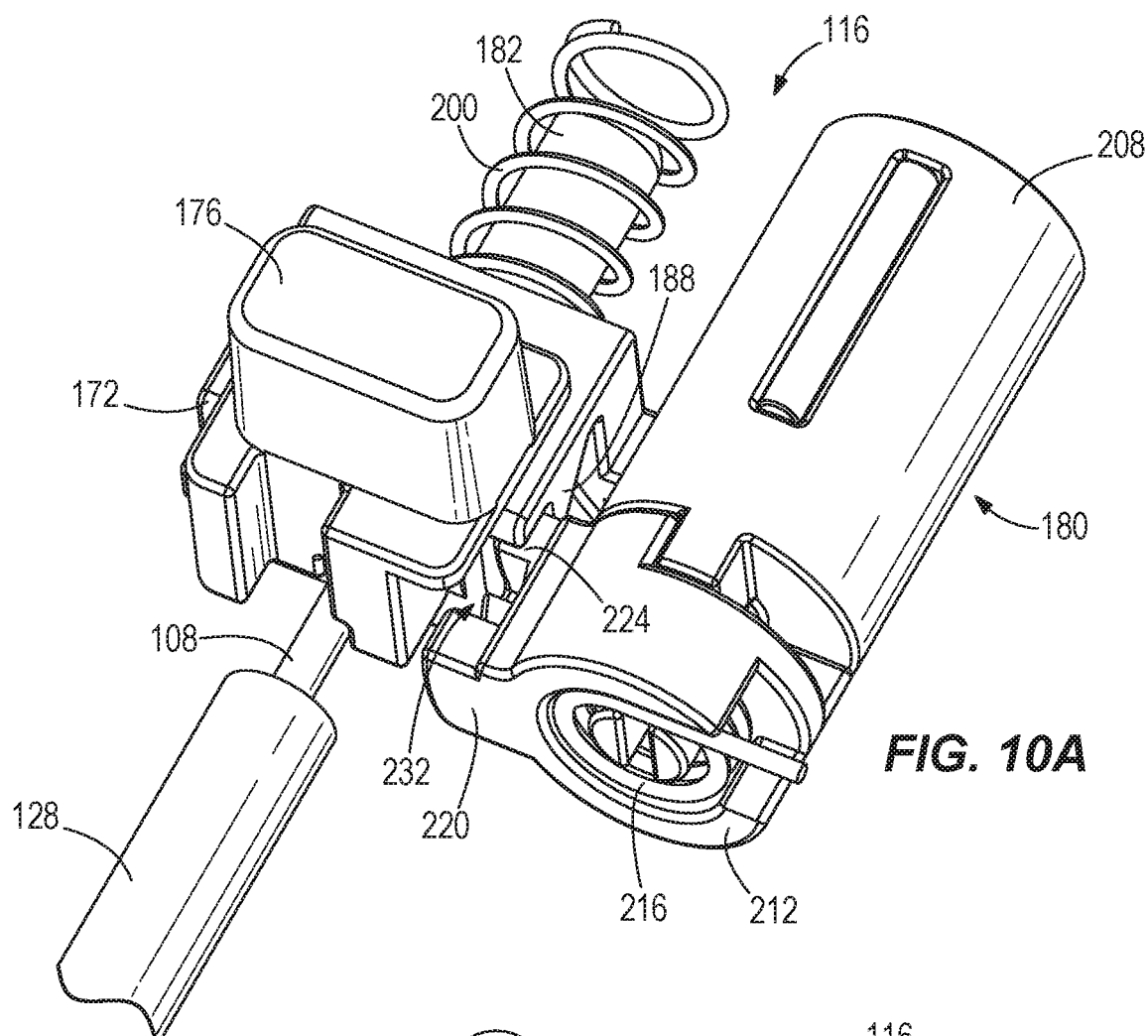
FIGS. 10A and 10B are enlarged perspective view of portions of the actuator assembly of the security apparatus of FIG. 1 when in the locked position, with the body removed.
Figure 10B:
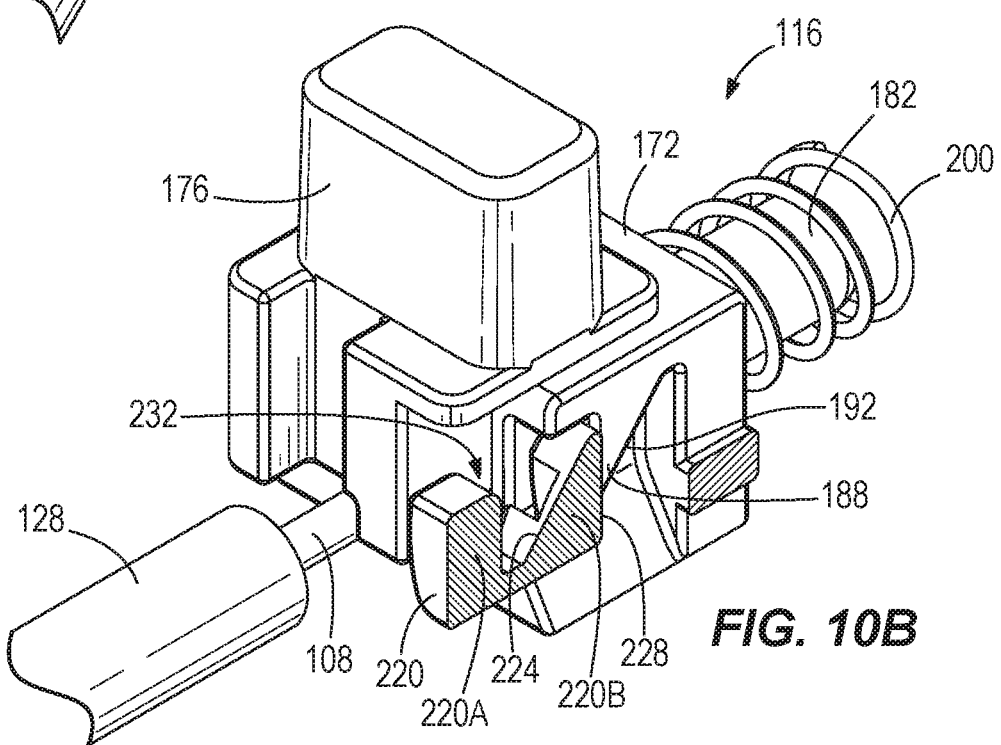

As shown in FIGS. 8A, 9A, and 10A, the illustrated lock mechanism 180 includes a lock cylinder 208, a lock member 212, and a biasing member 216. The lock cylinder 208 is positioned within the body 168 and is configured to receive a key. In the illustrated embodiment, the key is operable to selectively unlock the lock mechanism 180 and, thereby, selectively allow movement of the actuator 176 relative to the body 168 and the movable member 172. In other embodiments, the key may be operable to both selectively lock and unlock the lock mechanism 180. The lock member 212, or toggle, is coupled to an end of the lock cylinder 208 for movement relative to the lock cylinder 208. The illustrated lock member 212 includes a projection 220 extending toward and engaging the movable member 172. The projection 220 includes an inclined or ramped surface 224 and a back surface 228. The ramped surface 224 defines a recess 232 that is shaped and sized to receive the tooth 188 of the movable member 172. The recess 232 divides the projection 220 into two lobes 220A, 220B (FIGS. 8B, 9B, and 10B). The back surface 228 is formed on the second lobe 220B. The lock member 212 is movable (e.g., rotatable) between a first position (FIGS. 8A-8B and 10A-10B), in which the projection 220 extends toward the movable member 172, and a second position (FIGS. 9A-9B), in which the projection 220 is pivoted away from the movable member 172 (e.g., downward in the figures). The biasing member 216 is coupled to the lock member 212 to bias the lock member 212 toward the first position. In the illustrated embodiment, the biasing member 216 is a torsion spring. In other embodiments, other suitable biasing members may also or alternatively be employed.

FIGS. 8A-10B illustrate operation of the actuator assembly 116. Initially, when the security apparatus 100 is in the unlocked position (FIGS. 8A-8B), the manual actuator 176 is in the extended position, the movable member 172 is pushed by the biasing member 200 toward the lock head 112, and the lock member 212 extends toward the movable member 172 so that the recess 232 receives the tooth 188. From this position, the manual actuator 176 can be depressed by a user to move the security apparatus 100 to the locked position. In particular, depressing the manual actuator 176 in the direction of arrow B causes the ramped surface 204 of the actuator 176 to push against the first ramped surface 184 of the movable member 172. The movable member 172 is then pushed away from the lock head 112. As the movable member 172 moves away from the lock head 112, the second ramped surface 192 on the tooth 188 pushes against the ramped surface 224 of the lock member 212, causing the lock member 212 to rotate in the direction of arrow C, as shown in FIGS. 9A-9B. The lock member 212 continues to rotate until the projection 220 (more particularly, the second lobe 220B) clears the apex of the tooth 188. Once the projection 220 clears the tooth 188, the lock member 212 is automatically rotated in the direction opposite arrow C under the force of the biasing member 216 to extend back toward the movable member 172, as shown in FIGS. 10A-B. In this position, the back surface 228 of the projection 220 engages the stop surface 196 of the tooth 188 to inhibit movement of the movable member 172 toward the lock head 112. The lock mechanism 180, thereby, holds the manual actuator 176, the movable member 172, and the lock head 112 in the locked position.

To release the lock head 112 from the locked position, a suitable key is inserted into the lock cylinder 208 and turned to move (e.g., rotate) the projection 220 of the lock member 212 temporarily out of engagement with the movable member 172. In particular, actuating the lock mechanism 180 with the key rotates the lock member 212 in the direction of arrow C (FIGS. 8A and 9A). As the lock member 212 rotates, the back surface 228 on the projection 220 slides along the stop surface 196 of the tooth 188. Once the projection 220 clears the tooth 188, the movable member 172 is movable back toward the lock head 112 under the force of the biasing member 200. Moving the movable member 172 toward the lock head 112 releases the cable 108 so that the lock head 112 also moves to the unlocked position. In addition, moving the movable member 172 toward the lock head 112 raises the manual actuator 176 back to the extended position (i.e., in the direction opposite arrow B). The manual actuator 176, the movable member 172, and the lock head 112 are then held in the unlocked position until the actuator 176 is depressed again.

In other embodiments, the cable 108 may be a different type of force-transmission member. For example, the force-transmission member 108 extending between the lock head 112 and the actuator assembly 116 may be a rigid structure, such as a rod. In this arrangement, the actuator assembly 116 may push the rigid force-transmission member (and, thereby, the plunger 144) to move the security apparatus 100 to the released position. In addition, the actuator assembly 116 may pull the rigid force-transmission member (and, thereby, the plunger 144) to move the security apparatus 100 to the locked position. With such an arrangement, the biasing members 148, 200 may be omitted.

Figure 16:
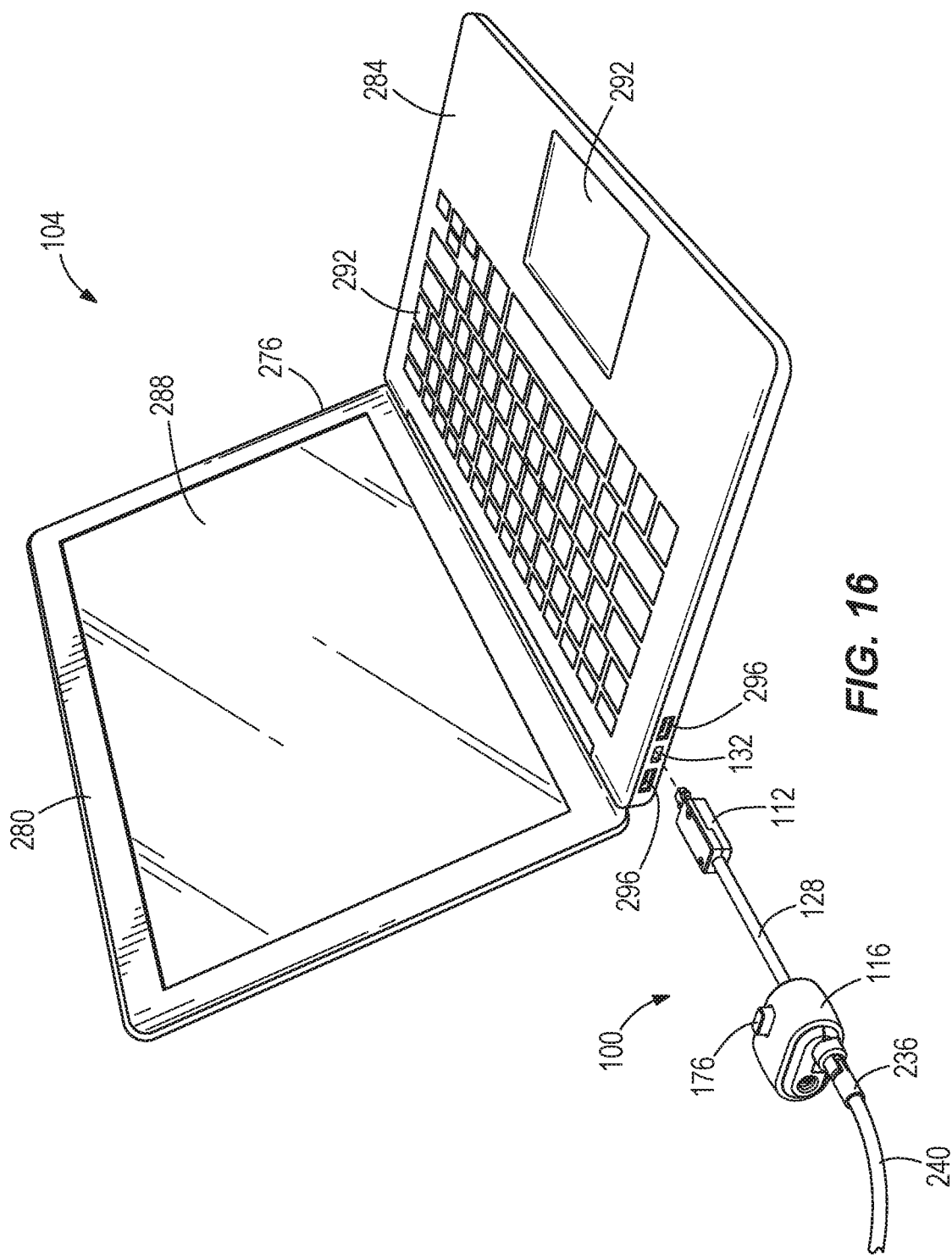
FIG. 16 illustrates the security apparatus of FIG. 1 and the portable electronic device.

Referring back to FIGS. 1 and 2, the actuator assembly also includes a mount 236 extending from the body 168. The mount 236 is configured to receive a security cable 240 (FIG. 16). The security cable 240 is fixed within the mount 236 and secured to an immovable object (e.g., a desk, a table, a wall, etc.) to secure the security apparatus 100, and thereby a connected portable electronic device, to the immovable object. The illustrated mount 236 includes a first portion 244 that is fixed to the body 168 and a second portion 248 that is pivotally coupled to the first portion 244. The second portion 248 defines a bore 252 that receives the security cable 240. The pivotal connection between the first and second portions 244, 248 allows the security cable 240 to be oriented in different directions relative to the body 168. In other embodiments, the actuator assembly 116 may be directly bolted, glued, or otherwise secured to an immovable object. In such embodiments, the mount 236 and the security cable 240 may be omitted.

Figure 11:
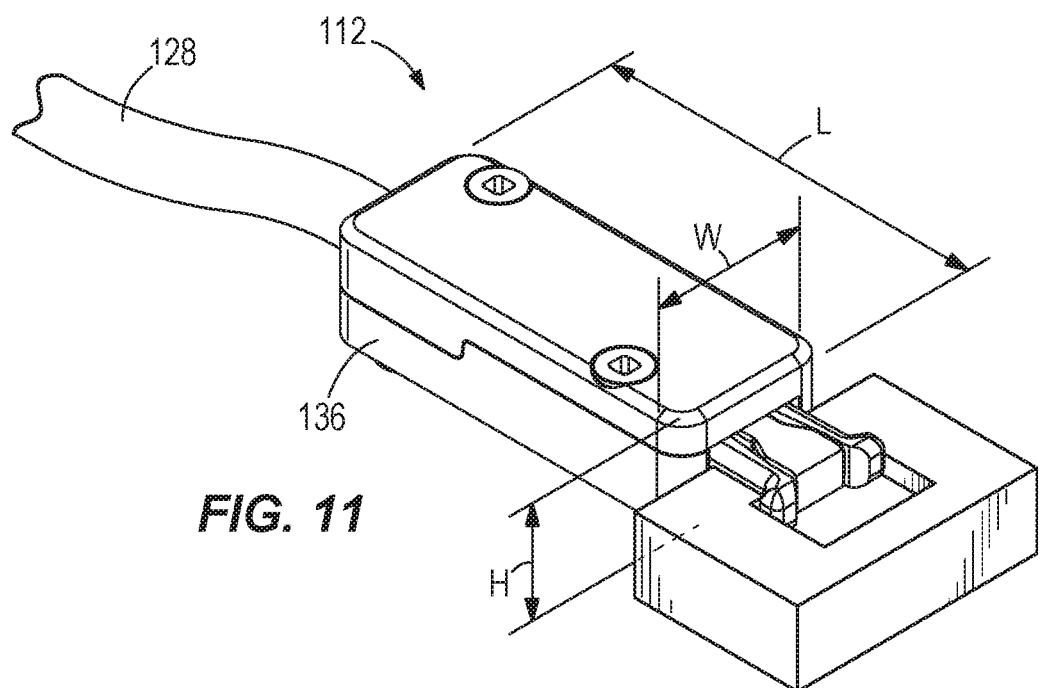
FIG. 11 is a perspective, partial cross-sectional view of the lock head of the security apparatus of FIG. 1 engaging a portable electronic device.

FIG. 11 illustrates the security apparatus 100 engaging the slot 132 in the portable electronic device 104. The security apparatus 100 is designed to take up a minimal amount of space immediately adjacent the device 104 so that the apparatus 100 does not interfere with or block other portions of the device 104. The illustrated locking head 112 of the security apparatus 100 has a length L, a width W, and a height H. In some embodiments, the length L is between about 15 mm and about 40 mm, the width W is between about 8 mm and about 15 mm, and the height H is between about 5 mm and about 11 mm. In the illustrated embodiment, the length L is about 28 mm, the width W is about 11.5 mm, and the height H is about 8 mm. The end profile of the locking head 112 (i.e., the end of the locking head 112 that faces the portable electronic device 104), therefore, is relatively small compared to other locking heads on the market. In other embodiments, other suitable dimensions of the locking head 112 that take up a minimal amount of space immediately adjacent the slot 132 may also be possible.

Figure 12:
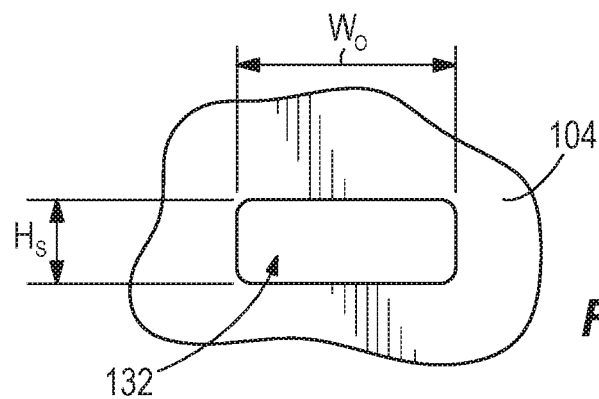
FIG. 12 is a plan view of a slot in the portable electronic device shown in FIG. 11.
Figure 13:
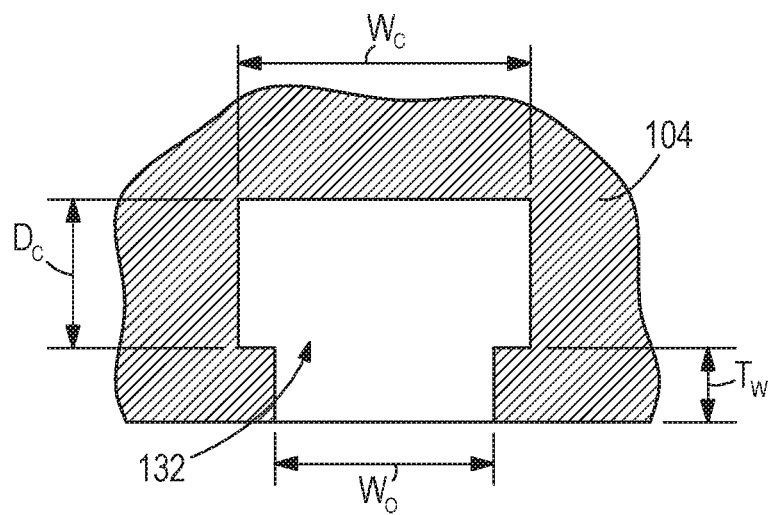
FIG. 13 is a cross-sectional view of the slot in the portable electronic device shown in FIG. 11.

As shown in FIGS. 12 and 13, the slot 132 in the portable electronic device 104 is dimensioned to receive the expandable portion 140 of the locking head 112. The illustrated slot 132 has an opening width $W_O$, a clearance width $W_C$, a slot height $H_S$, a wall thickness $T_W$, and a clearance depth Dc. The opening width $W_O$ is the width of the slot 132 at the exterior surface of the portable electronic device 104. The clearance width $W_C$ is the width of the slot 132 inside the device 104 to provide clearance for the expandable portion 140 to expand. The slot height $H_S$ is the height of the slot 132 at the exterior surface of the portable electronic device 104. The wall thickness $T_W$ is the thickness of an exterior wall of the device 104 that defines the slot 132 and that is engaged by the expandable portion 140 of the locking head 112. The clearance depth Dc is the depth or length of the slot 132 into the device 104 beyond the exterior wall. In some embodiments, the opening width $W_O$ is between about 6 mm and about 8 mm, the clearance width $W_C$ is at least about 9 mm, the slot height $H_S$ is between about 2 mm and about 4 mm, the wall thickness $T_W$ is between about 3 mm and about 5 mm, and the clearance depth Dc is at least about 4 mm. In such embodiments, the slot 132 has a total depth into the device 104 that is between about 7 mm and about 10 mm. In the illustrated embodiment, the opening width $W_O$ is about 7 mm, the slot height $H_S$ is about 3 mm, and the wall thickness $T_W$ is about 4 mm. In other embodiments, other suitable slot dimensions may also be possible.

FIGS. 14 and 15 illustrate the security apparatus 100 with customizable housing assemblies 256A-C, 260A-C. The housing assemblies 256A-C, 260A-C are positioned over the actuator assembly 116 to provide different visual appearances and/or tactile properties to the apparatus 100. For example, the housing assemblies 256A-C, 260A-C may be removable and interchangeable to provide different colors, as desired by a user. Additionally or alternatively, the housing assemblies 256A-C, 260A-C may include different indicia for various logos, brands, or other identifiers, as desired for particular applications.

As shown in FIG. 14, each of the illustrated housing assemblies 256A-C includes two clamshell covers 264A-C that surround an inner frame 268 of the actuator assembly 116. The clamshell covers 264A-C may be formed of, for example, a plastic material and may snap together to substantially cover the inner frame 268. In contrast, the inner frame 268 of the actuator assembly 116 may be composed of, for example, die cast zinc or other relatively hard metallic materials. Together, the clamshell covers 264A-C and the inner frame 268 form the body 168 of the actuator assembly 116.

As shown in FIG. 15, each of the illustrated housing assemblies 260A-C includes a rubber outer ring 272A-C that surrounds the inner frame 268 of the actuator assembly 116. The outer rings 272A-C may be formed of an elastomeric material such that the rings 272A-C can stretch and deform to substantially cover the inner frame 268. The outer rings 272A-C also provide a softer surface than the metallic inner frame 268 to absorb impacts in case the actuator assembly 116 is accidentally dropped and/or impacts another surface. Furthermore, the outer rings 272A-C have higher coefficients of friction than the metallic inner frame 268 to inhibit the actuator assembly 116 from freely sliding along a surface. Together, the outer ring 272A-C and the inner frame 268 form the body 168 of the actuator assembly 116. In some embodiments, the clamshell covers 264A-C and the rubber outer rings 272A-C may be used in combination (e.g., one of the outer rings 272A-C may surround one of the clamshell covers 264A-C). In other embodiments, the clamshell covers 264A-C and the outer rings 272A-C may be omitted.

FIG. 16 illustrates the security apparatus 100 in use with the portable electronic device 104. The illustrated portable electronic device 104 is a laptop computer. The laptop computer 104 includes a housing 276 that is divided into a monitor portion 280 and a base portion 284. The monitor and base portions 280, 284 are pivotally coupled together. The monitor portion 280 supports a screen 288. The base portion 284 supports input devices 292 (e.g., a keyboard and a touchpad). In the illustrated embodiment, the slot 132 is formed in the base portion 284 between two USB ports 296. When the lock head 112 is inserted into the slot 132 and moved to the locked position, the security apparatus 100 is secured to the laptop computer 104. The security apparatus 100, in turn, is secured to an immovable object by the security cable 240 so that the laptop computer 104 is secured to the immovable object. In addition, the actuator assembly 116 is spaced apart or positioned away from the laptop computer 104 so that the actuator assembly 116 does not block or interfere with the USB ports 296 (or any other ports, buttons, connectors, etc.) on the base portion 284.

Figure 17:
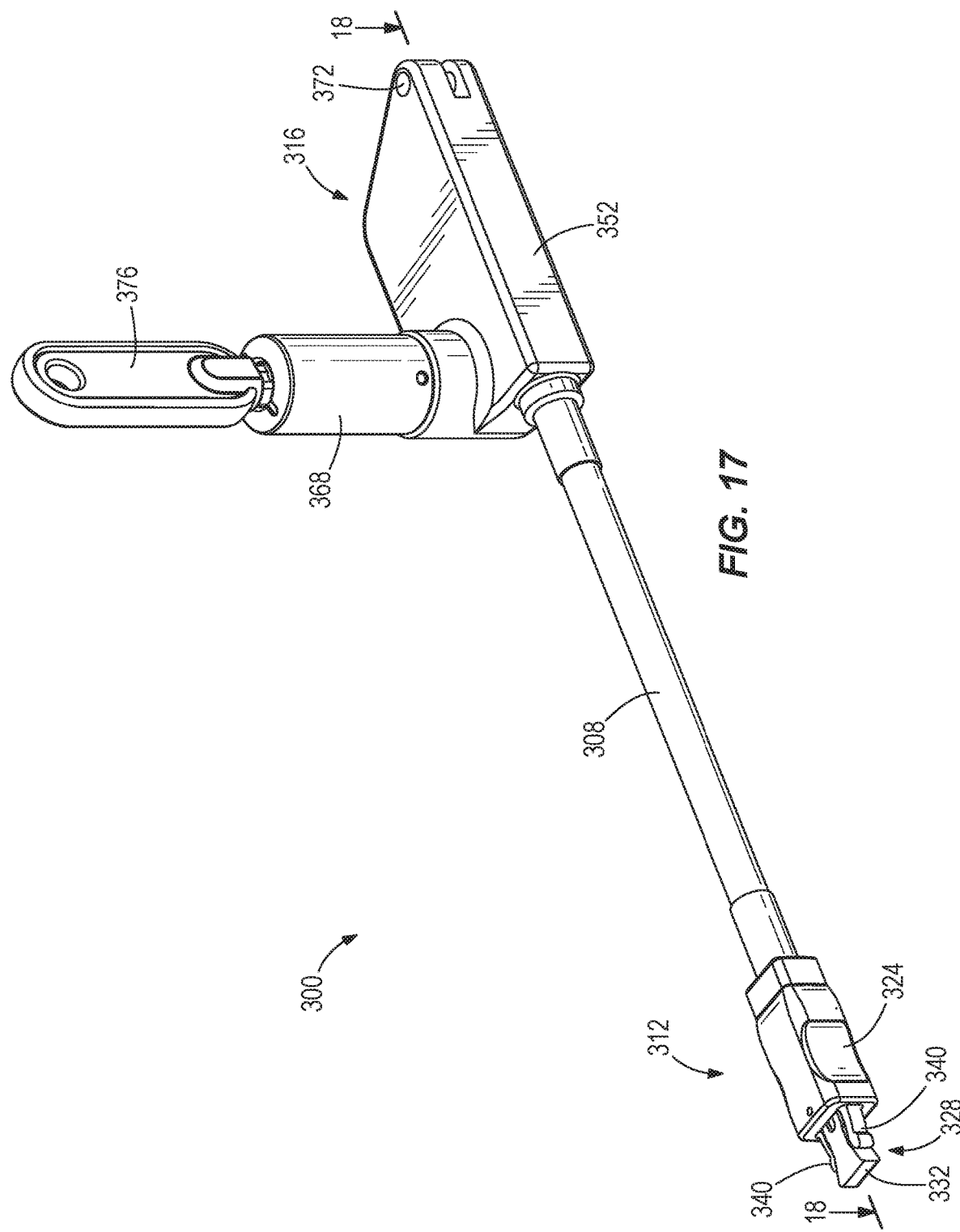
FIG. 17 is a perspective view of another security apparatus embodying the invention.

FIGS. 17-19 illustrate another security apparatus 300. The security apparatus 300 is similar to the security apparatus 100 discussed above with reference to FIGS. 1-16. Reference is made to the description of the security apparatus 100 above for details of the structure and operation of the security apparatus 300 not included below. The illustrated security apparatus 300 includes a cable 304, an outer sheath 308, a lock head 312, and an actuator assembly 316.

As shown in FIGS. 18 and 19, the lock head 312 is coupled to a first end 320 of the cable 304. The illustrated lock head 312 includes a body 324, an expandable portion 328, a plunger 332, and a biasing member 336. In the illustrated embodiment, the expandable portion 328 includes two latches 340 that are integrally formed with the body 324. In other embodiments, the latches 340 may be discrete elements that are separate from the body 324. The illustrated plunger 332 is coupled to the cable 304 by a bushing 344. Similar to the lock head 112 described above, when the plunger 332 is actuated (e.g., pulled by the cable 304), the latches 340 move radially outward. As the latches 340 move (e.g., flex) outwardly, the latches 340 engage a portable electronic device to secure the lock head 312 to the device. When the cable 304 is released, the biasing member 336 returns the plunger 332 to an extended position (FIG. 18) so that the latches 340 can move radially inward. As the latches 340 move inwardly, the latches 340 disengage the portable electronic device so that the lock head 312 is unsecured from the device.

The actuator assembly 316 is coupled to a second end 348 of the cable 304. The actuator assembly 316 is operable to actuate (e.g., pull) the cable 304 and, thereby, the plunger 332 in the lock head 312. The illustrated actuator assembly 316 includes a body 352, a movable member 356, a biasing member 360, a lever 364, and a lock mechanism 368. The body 352 is fixed to the outer sheath 308 adjacent the second end 348 of the cable 304. The body 352 houses and supports the other components of the actuator assembly. The body 352 also defines a pair of openings 372 for receiving a security cable (e.g., the security cable 240 shown in FIG. 16). The security cable can be threaded through the openings 372 and secured to an immovable object to secure the security apparatus 300, and thereby the portable electronic device, to the immovable object.

The movable member 356 is positioned within the body 352 and coupled to the second end 348 of the cable 304. The illustrated movable member 356 is a lock block that is movable within the body 352 to pull and release the cable 304. The biasing member 360 biases the movable member 356 toward the lock head 312 to release the cable 304. In the illustrated embodiment, the biasing member 360 is a coil spring that is wrapped around the cable 304. In other embodiments, other suitable biasing members may also or alternatively be employed.

The lever 364 is positioned within the body 352 and coupled to the lock mechanism 368. The lever 364 is operable to pivot relative to the body 352 to move the movable member 356. The illustrated lever 364 pivots between a first position (FIG. 18), in which the movable member 356 is allowed to move toward the lock head 312 under the force from the biasing member 360, and a second position (FIG. 19), in which the lever 364 pushes the movable member 356 away from the lock head 312 against the biasing member 360. The lever 364 can be secured in either position by the lock mechanism 368.

As shown in FIG. 17, the illustrated lock mechanism 368 is a cylinder lock that extends generally perpendicularly from the body 352 (relative to a longitudinal axis of the cable 304 when the cable 304 extends straight from the actuator assembly 316). The lock mechanism 368 is configured to receive a key 376 to selectively lock and unlock the lock mechanism 368. In this embodiment, the key 376 functions as a manual actuator. When the lock mechanism 368 is unlocked (e.g., when the key 376 is turned in a first direction), the lever 364 is pivoted to the first position (FIG. 18) so that the movable member 356 can slide toward the lock head 312 under the force of the biasing member 360. In this position, the movable member 356 releases the cable 304 to allow the expandable portion 328 to relax radially inward. When the lock mechanism 368 is locked (e.g., when the key 376 is turned in a second direction), the lever 364 is pivoted to the second position (FIG. 19) so that the lever 364 pushes the movable member 356 away from the lock head 312 against the force of the biasing member 360. In this position, the movable member 356 pulls the cable 304 to move the plunger 332 and expand the expandable portion 328.

Figure 20:
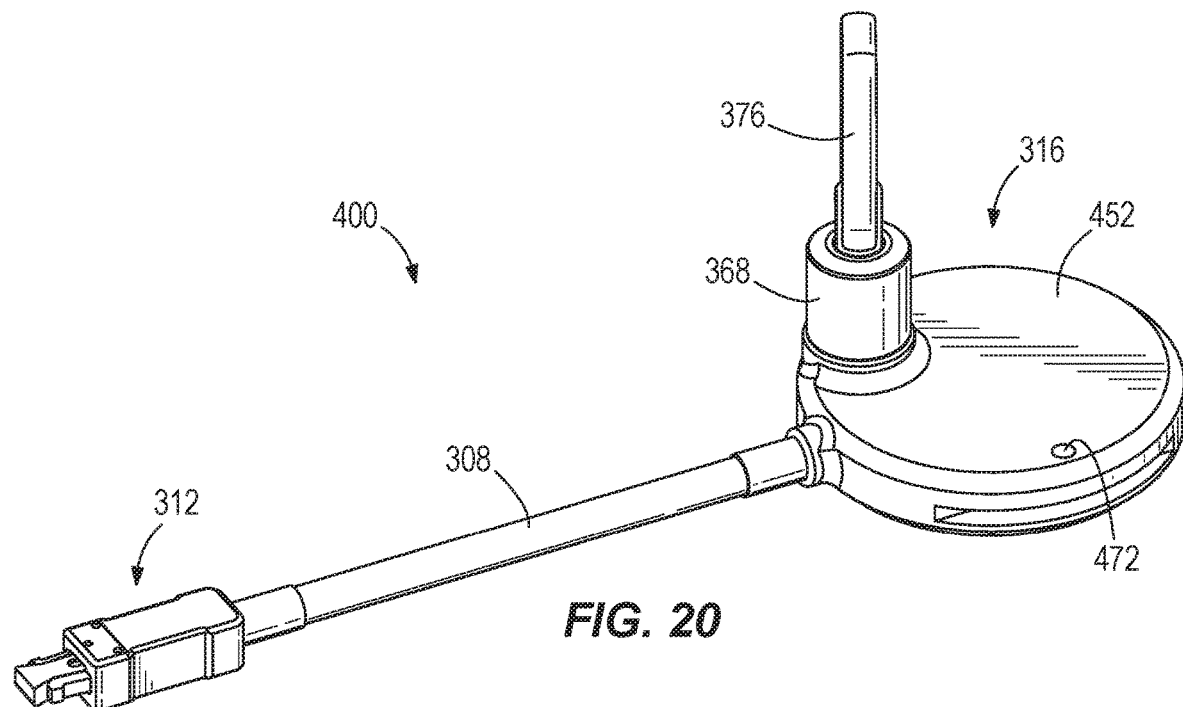
FIG. 20 is a perspective view of another security apparatus embodying the invention.
Figure 21:
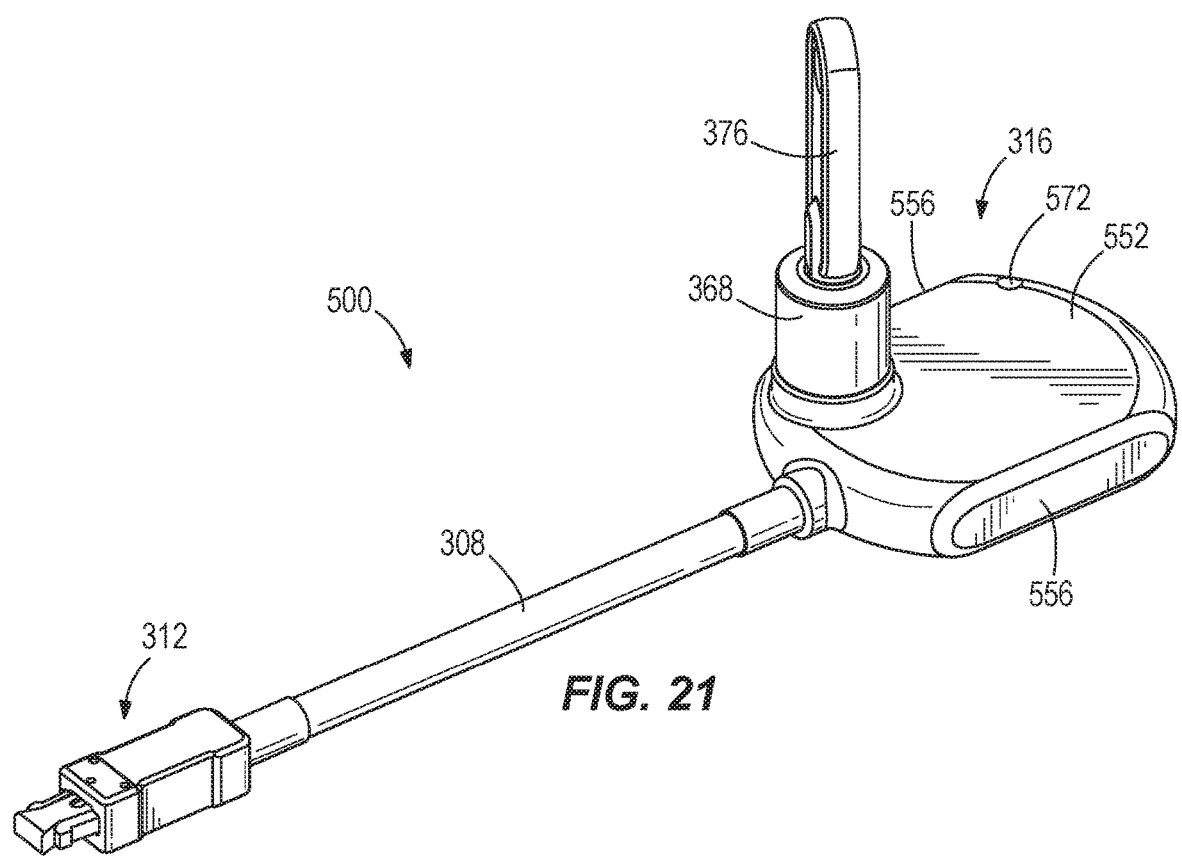
FIG. 21 is a perspective view of another security apparatus embodying the invention.
Figure 22:
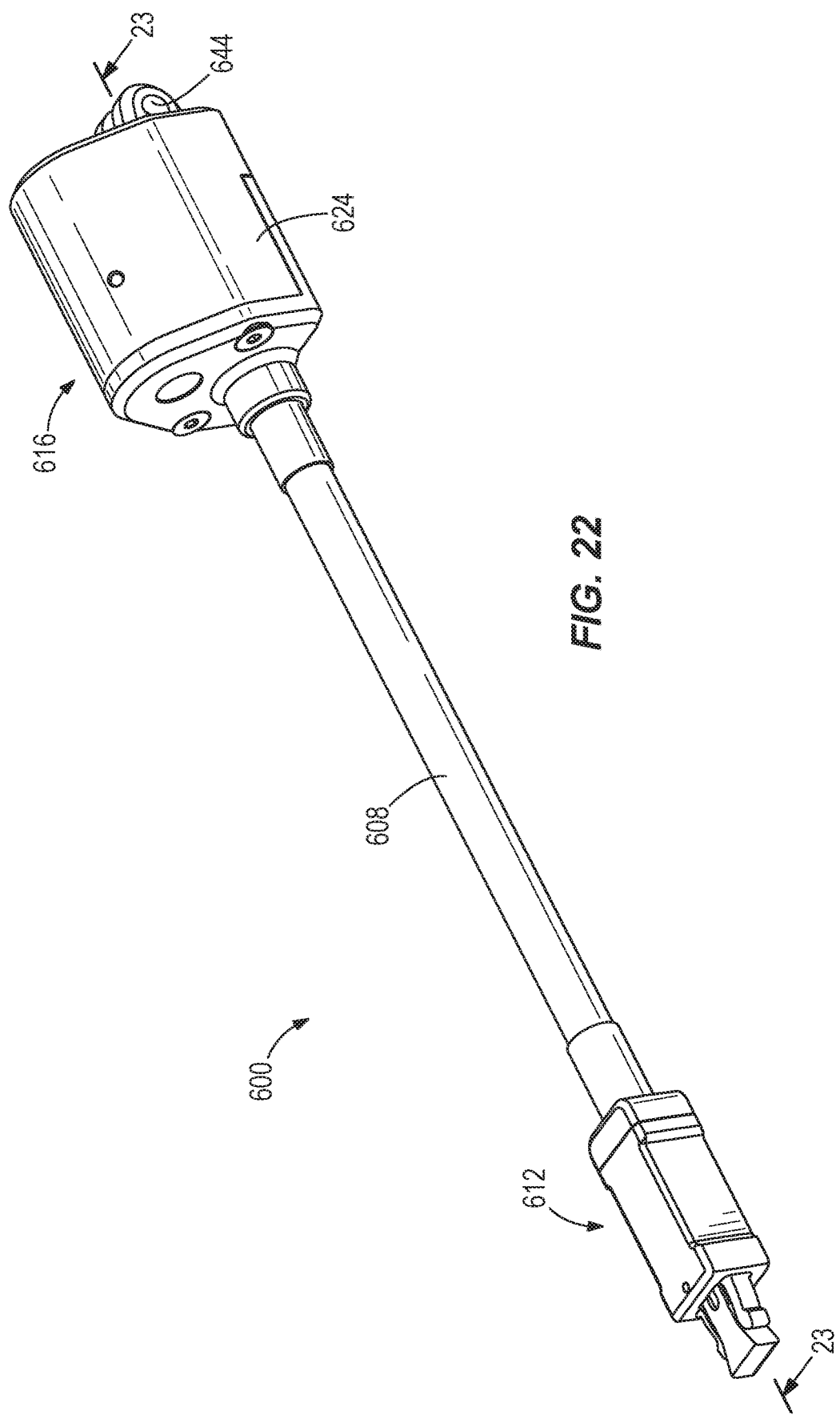
FIG. 22 is a perspective view of another security apparatus embodying the invention.
Figure 23:
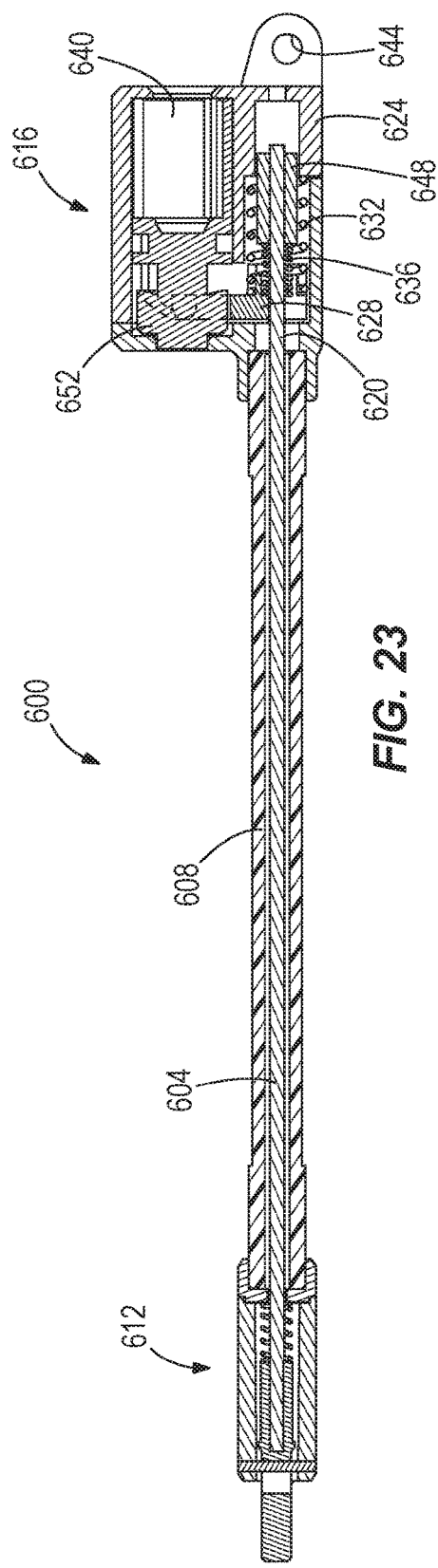
FIG. 23 is a cross-sectional view of the security apparatus taken along section line 23-23 of FIG. 22, with the security apparatus in an unlocked position.
Figure 24:
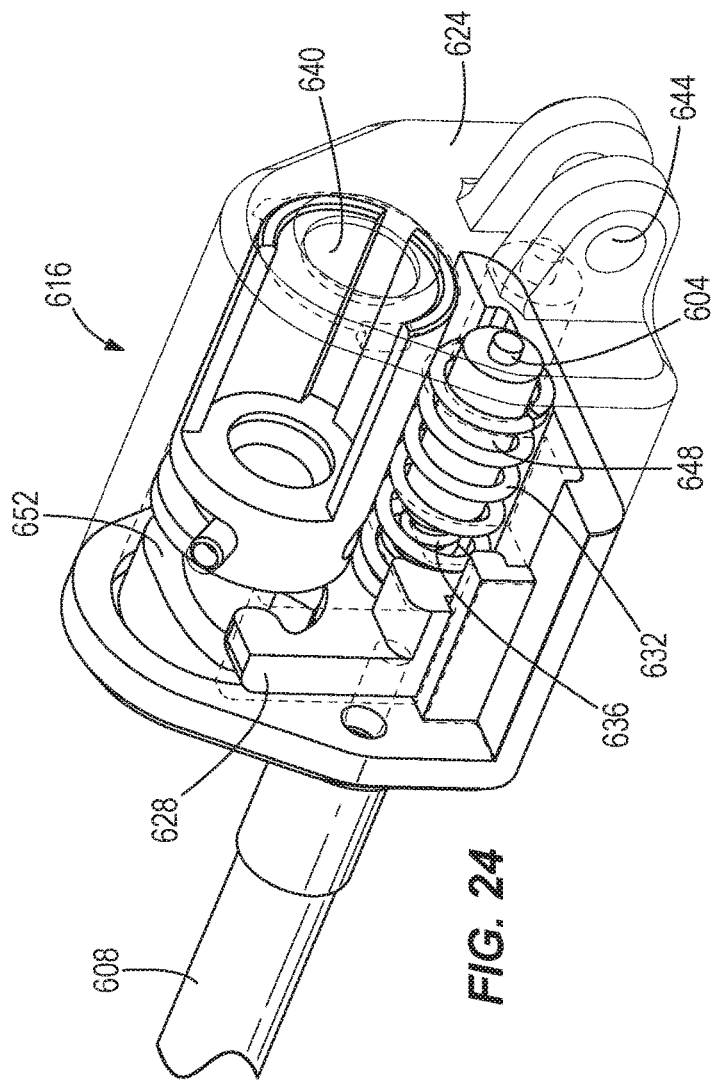
FIG. 24 is a partially-transparent, perspective view of an actuator assembly of the security apparatus of FIG. 22 when in the unlocked position.

FIGS. 20 and 21 illustrate security apparatuses 400, 500 that are similar to the security apparatus 300 of FIGS. 17-19, and like parts have been given the same reference numbers. The actuator assembly 316 of the security apparatus 400 shown in FIG. 20, however, includes a body 452 that is generally circular in cross-section. The body 452 defines an opening 472 for receiving a security cable (e.g., the security cable 240 shown in FIG. 16). The actuator assembly 316 of the security apparatus 500 shown in FIG. 21 includes a body 552 having flattened, opposing sides 556 such that the body 552 is oblong in cross-section. The body 552 also defines an opening 572 for receiving a security cable (e.g., the security cable 240 shown in FIG. 16).

FIGS. 22-26 illustrate another security apparatus 600. The security apparatus 600 is similar to the security apparatus 100 discussed above with reference to FIGS. 1-16. Reference is made to the description of the security apparatus 100 above for details of the structure and operation of the security apparatus 600 not included below. The illustrated security apparatus 600 includes a cable 604, an outer sheath 608, a lock head 612, and an actuator assembly 616. The cable 604, the outer sheath 608, and the lock head 612 are substantially the same as the cable 108, the outer sheath 128, and the lock head 112 discussed above.

Figure 25:
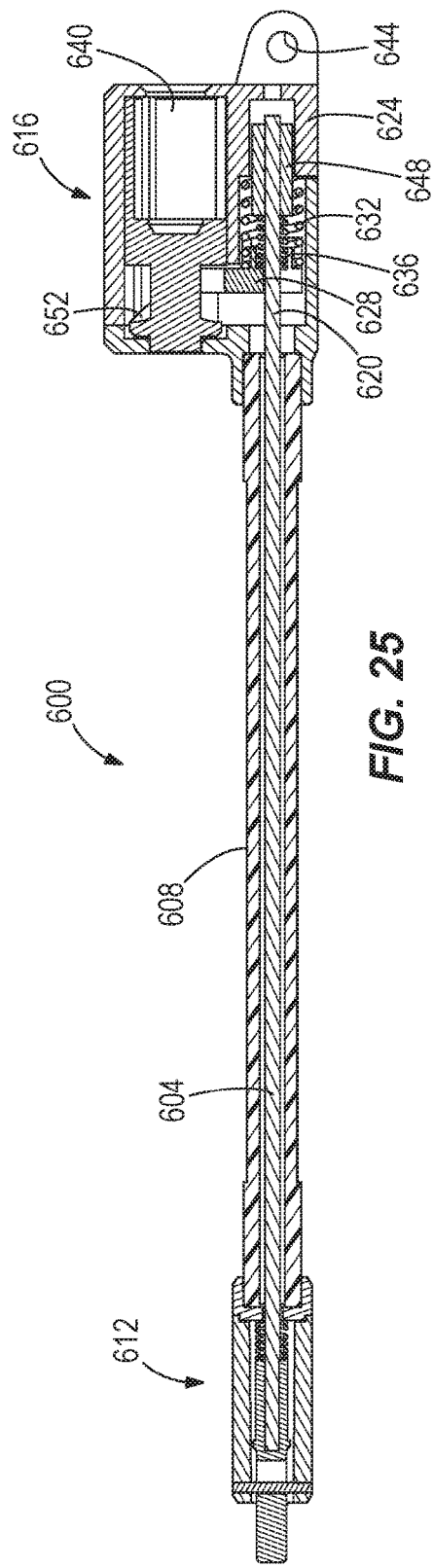
FIG. 25 is a cross-sectional view of the security apparatus taken along section line 23-23 of FIG. 22, with the security apparatus in a locked position.
Figure 26:
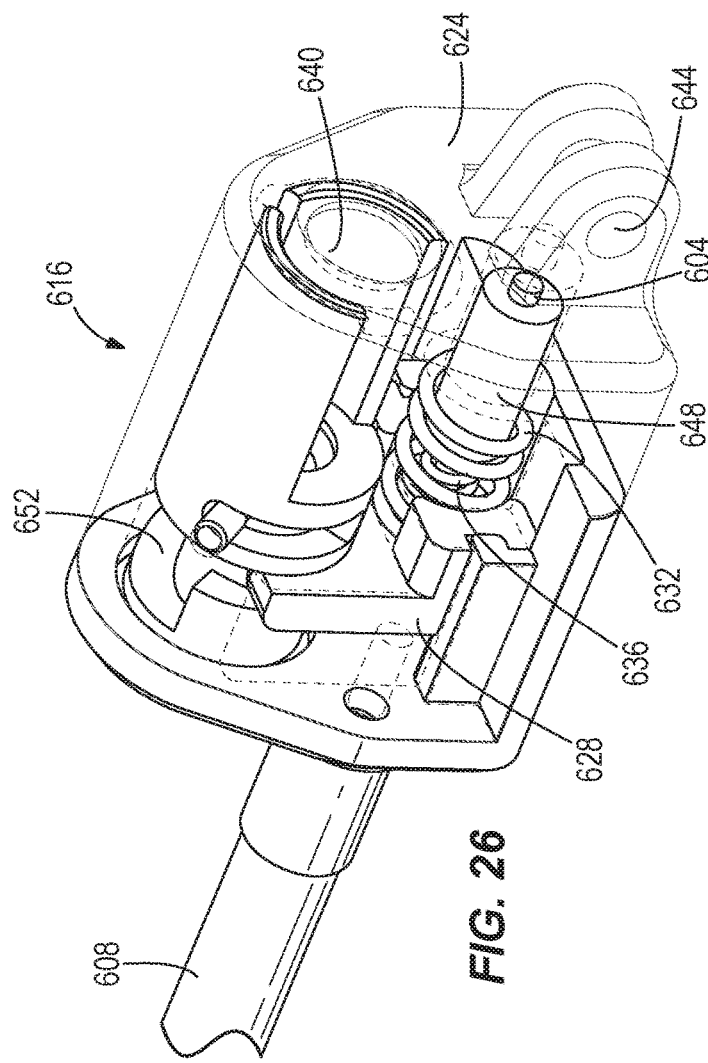
FIG. 26 is a partially-transparent, perspective view of the actuator assembly of the security apparatus of FIG. 22 when in the locked position.

As shown in FIGS. 23-26, the actuator assembly 616 is coupled to an end 620 of the cable 604 opposite from the lock head 612. The actuator assembly 616 is operable to actuate (e.g., pull) the cable 604 to move the lock head 612 between an unlocked position (FIG. 23) and a locked position (FIG. 25). The illustrated actuator assembly 616 includes a body 624, a movable member 628, two biasing members 632, 636, and a lock mechanism 640. The body 624 is fixed to the outer sheath 608 adjacent the end 620 of the cable 604. The body 624 houses and supports the other components of the actuator assembly 616. The body 624 also defines a pair of openings 644 for receiving a security cable (e.g., the security cable 240 shown in FIG. 16) that secures the actuator assembly 616 to an immovable object.

The movable member 628 is positioned within the body 624 and coupled to the end 620 of the cable 604. The illustrated movable member 628 is a cam follower that is movable within the body 624 to pull and release the cable 604. The biasing members 632, 636 bias the movable member 628 toward the lock head 612 to release the cable 604. In the illustrated embodiment, the biasing members 632, 636 are coil springs that are wrapped around the cable 604. The first biasing member 632 extends between an inner surface of the body 624 and the movable member 628. The second biasing member 636 extends between a sleeve 648 secured to the cable 604 and the movable member 628. In other embodiments, other suitable biasing members may also or alternatively be employed.

In the illustrated embodiment, the lock mechanism 640 is a cylinder lock that extends generally parallel to a longitudinal axis of the cable 604 (when the cable 604 extends straight from the actuator assembly 616). The lock mechanism 640 includes a cam 652 that engages the movable member 628. The lock mechanism 640 is also configured to receive a key to selectively rotate the lock mechanism 640 and, more particular, the cam 652. In this embodiment, the key functions as a manual actuator. When the lock mechanism 640 is rotated by the key to the unlocked position (FIGS. 23 and 24), the cam 652 allows the movable member 628 to be pushed by the biasing members 632, 636 toward the lock head 616. In this position, the cable 604 is released so that the lock head 612 is in the unlocked position. When the lock mechanism 640 is rotated by the key to the locked position (FIGS. 25 and 26), the cam 652 pushes the movable member 628 against the force of the biasing members 632, 636. In this position, the cable 604 is pulled by the movable member 628 to move the lock head 612 to the locked position.

Figure 27:
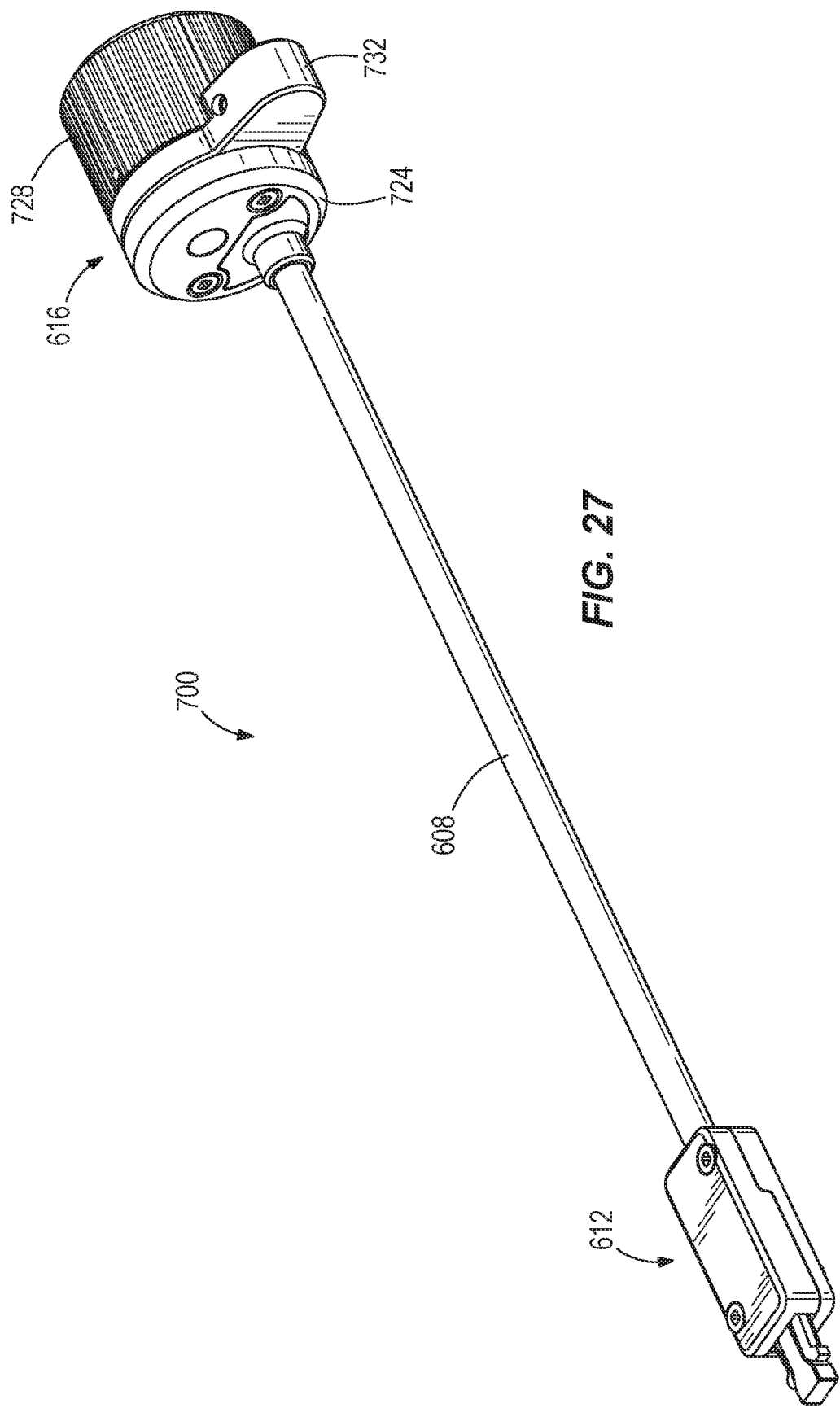
FIG. 27 is a perspective view of another security apparatus embodying the invention.

FIG. 27 illustrates a security apparatus 700 that is similar to the security apparatus 600 shown in FIGS. 22-26, and like parts have been given the same reference numbers. The actuator assembly 616 of the security apparatus 700 shown in FIG. 27, however, has a generally cylindrical body 724, rather than the mailbox-shaped body 624 shown in FIG. 22. In addition, the cylindrical body 724 includes a rippled outer surface 728 to facilitate handling the actuator assembly 616.

The cylindrical body 724 also includes a boss 732 extending radially from a mid portion of the body 724. The boss 732 is configured to receive a portion of a security cable to connect the actuator assembly 616 to an immovable object.

FIGS. 28-30 illustrate another security apparatus 800. The security apparatus 800 is similar to the security apparatus 100 discussed above with reference to FIGS. 1-16. Reference is made to the description of the security apparatus 100 above for details of the structure and operation of the security apparatus 800 not included below. The illustrated security apparatus 800 includes a cable 804, an outer sheath 808, a lock head 812, and an actuator assembly 816.

As shown in FIG. 29, the lock head 812 includes an expandable portion 820 and a plunger 824. The expandable portion 820 is fixed to the outer sheath 808. In the illustrated embodiment, the expandable portion 820 includes four collet tabs 828. The collet tabs 828 are movable (e.g., flexible) radially outward and away from each from an unlocked position to a locked position. When the collet tabs 828 move radially outward to the locked position, the tabs 828 can engage a portable electronic device to secure the lock head 812 to the device. When the collet tabs 828 move radially inward to the unlocked position, the tabs 828 disengage the portable electronic device such that the lock head 812 can be removed from the device. The illustrated collet tabs 828 are configured to fit within and engage a circular opening in a portable electronic device, rather than the rectangular slot or opening 132 shown in FIGS. 11-13 and 16.

The plunger 824 is positioned within the expandable portion 820 and coupled to the cable 804. The illustrated plunger 824 is generally conical in shape with a flared (i.e., larger diameter), distal free end 832. Similar to the plunger 144 discussed above, the illustrated plunger 824 is movable with the cable 804 relative to the expandable portion 820 to push the collet tabs 828 radially outward and into the locked position.

As shown in FIG. 30, the actuator assembly 816 is coupled to an end 836 of the cable 804 opposite from the lock head 812. The actuator assembly 816 is operable to actuate (e.g., pull) the cable 804 to move the lock head 812 between the unlocked position and the locked position. The illustrated actuator assembly 816 includes a body 840, a movable member 844, and a lock mechanism 848. The body 840 is fixed to the outer sheath 808 adjacent the end 836 of the cable 804. The body 840 houses and supports the other components of the actuator assembly 816.

The movable member 844 extends from the lock mechanism 848 and is coupled to the end 836 of the cable 804. The illustrated movable member 844 is a lever that is pivoted by the lock mechanism 848 to push and pull the cable 804 toward and away from the lock head 812. When the lever 844 is pivoted to pull the cable 804 away from the lock head 812, the cable 804 pulls the plunger 824 to expand the collet tabs 828. When the lever 844 is pivoted to push or release the cable 804, the cable 804 allows the flared end 832 of the plunger 824 to slide axially out of the expandable portion 820 so that the collet tabs 828 can relax radially inward. In some embodiments, a biasing member may be coupled to the plunger 832 and/or the movable member 844 to bias the security apparatus 800 to the unlocked position.

In the illustrated embodiment, the lock mechanism 848 is a cylinder lock supported by the body 840. The lock mechanism 848 is directly coupled to the movable member 844 to pivot the movable member 844. The lock mechanism 848 is also configured to receive a key to selectively rotate the lock mechanism 848. In this embodiment, the key functions as a manual actuator. When the lock mechanism 848 is rotated by the key to the unlocked position, the lever 844 pushes the cable 804. In this position, the cable 804 is released so that the lock head 812 is moved to the unlocked position. When the lock mechanism 848 is rotated by the key to the locked position, the lever 844 pulls the cable 804. In this position, the cable 804 is tensioned so that the lock head 812 is moved to the locked position.

FIGS. 31-34 illustrate another security apparatus 900. The security apparatus 900 is similar to the security apparatus 100 discussed above with reference to FIGS. 1-16. Reference is made to the description of the security apparatus 100 above for details of the structure and operation of the security apparatus 900 not included below. The illustrated security apparatus 900 includes a cable 904, an outer sheath 908, a lock head 912, and an actuator assembly 916. The cable 904, the outer sheath 908, and the lock head 912 are substantially the same as the cable 304, the outer sheath 308, and the lock head 312 shown in FIGS. 17-19.

The illustrated actuator assembly 916 includes a body 920 and a manual actuator 924. Unlike the previously-described versions of security apparatuses, the actuator assembly 916 does not include a lock mechanism. The manual actuator 924 is pivotally coupled to the body 920. In the illustrated embodiment, the manual actuator 924 includes a handle 928 and a flange 932. The handle 928 is configured to be grasped by a user to pivot the actuator 924. The flange 932 is secured to an end 936 of the cable 904 to selectively move the cable 904. When the actuator 924 is pivoted to an unlocked position (FIGS. 31 and 32), the flange 932 is moved flush with a rear surface 940 of the body 924. In addition, the handle 928 is pivoted at least slightly away from an upper surface 944 of the body 920. In this position, the flange 932 pushes or releases the cable 904 so that the lock head 912 moves to the unlocked position. When the actuator 924 is pivoted to the locked position (FIGS. 33 and 34), the flange 932 is moved away from the rear surface 940 of the body 920. In addition, the handle 928 is pivoted to lie flat on the upper surface 944 of the body 920. In this position, the flange 932 pulls the cable 904 so that the lock head 912 moves to the locked position.

In some embodiments, the manual actuator 924 may be biased to either the unlocked position or the locked position. For example, the actuator 924 may be biased by a biasing member (e.g., a torsion spring) toward the unlocked position. In such embodiments, the body 920, the handle 928, and/or the flange 932 may include a lock, latch, detent, magnet, or other securement mechanism to hold the actuator 924 in the locked position. Alternatively, the actuator 924 may be biased by a biasing member toward the locked position. In such embodiments, a user may temporarily actuate the actuator 924 to the unlocked position, connect the lock head 912 to a portable electronic device while the actuator is actuated 924, and then release the actuator 924 to secure the security apparatus 900 to the device.

In other embodiments, the manual actuator 924 may be configured as an over-center latch that moves to either the unlocked position or the unlocked position, but does not remain in any intermediate positions.

Figure 35:
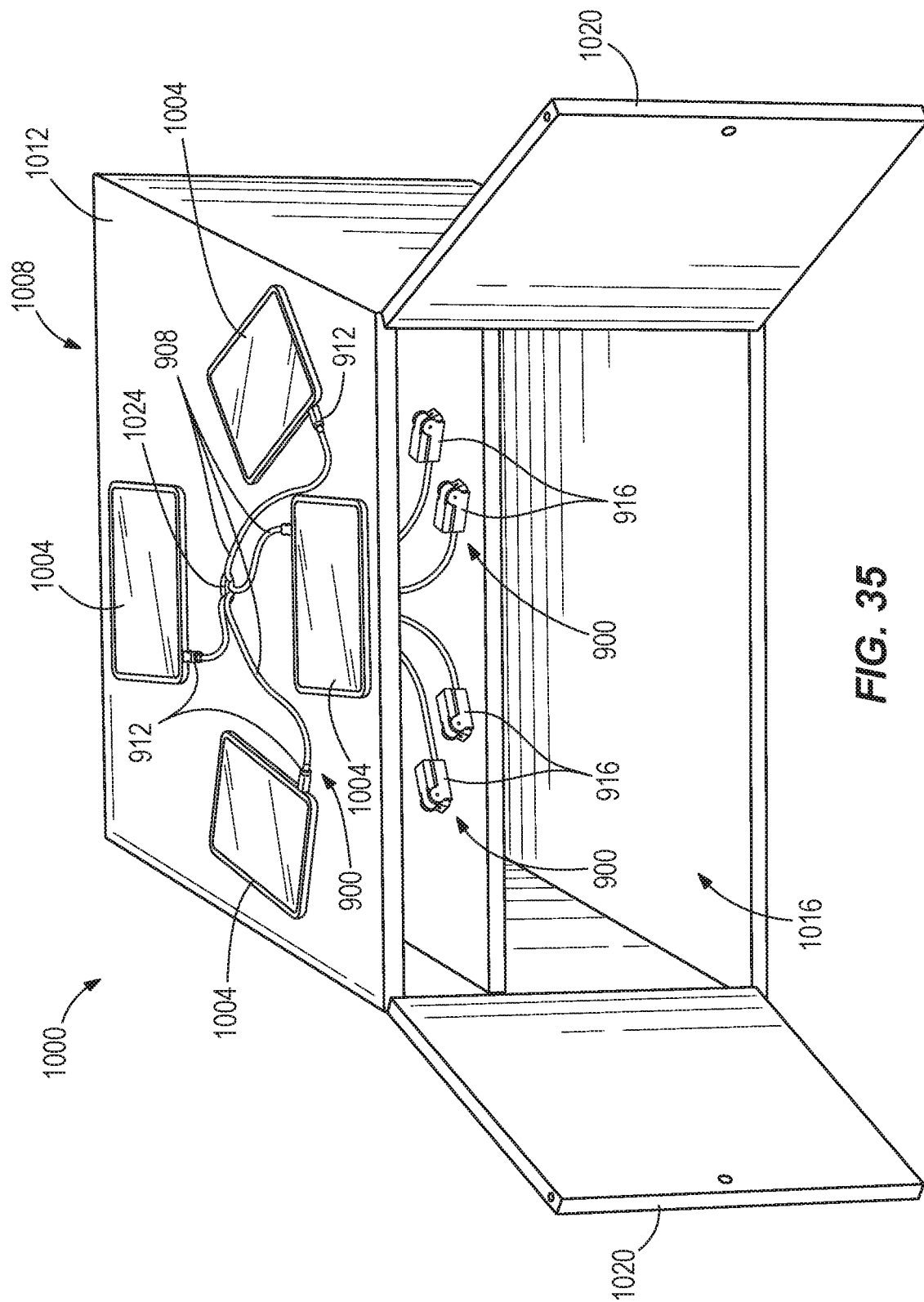
FIG. 35 illustrates a system for securing portable electronic devices with security apparatuses that embody the invention.

FIG. 35 illustrates a system 1000 for securing or locking a plurality of portable electronic devices 1004 in place. In the illustrated embodiment, the portable electronic devices 1004 are tablet computers. The illustrated system 1000 includes a plurality of the security apparatuses 900 and an enclosure 1008. Each security apparatus 900 is connected to one of the portable electronic devices 1004. Although the illustrated security apparatuses 900 do not include lock mechanisms, in other embodiments the apparatuses 900 may also include individual lock mechanisms. More particularly, any of the security apparatuses described herein may be used in place of the security apparatuses 900 shown in the figure.

The illustrated enclosure 1008 is a cabinet including an outer wall 1012. The outer wall 1012 defines an interior volume 1016 of the cabinet 1008 and has two doors 1020 that provide selective access to the interior volume 1016. A relatively small hole or opening 1024 is formed in the outer wall 1012 and in communication with the interior volume 1016. The cables and the outer sheaths 908 of the security apparatuses 900 extend through the opening 1024 such that the lock heads 912 (and the attached portable electronic devices 1004) are positioned and accessible from outside of the cabinet 1008, but the actuator assemblies 916 are positioned inside the cabinet 908. The hole 1024 is sized to be smaller than the actuator assemblies 916 so that the actuator assemblies 916 cannot be pulled out of the cabinet 1008 through the hole 1024. The cabinet 1008 encloses the actuator assemblies 916 to inhibit unauthorized users from accessing the actuator assemblies 916 and, thereby, releasing (i.e., unlocking) the portable electronic devices 1004. The cabinet 1008 itself can be locked and require a key, combination, passcode, biometric identifier, wireless signal (e.g., RFID or Bluetooth signal), or the like to be unlocked. In other embodiments, other suitable types of enclosures may be used to store and secure the actuator assemblies 916 of the security apparatuses 900 in a remote location.

Figure 36:
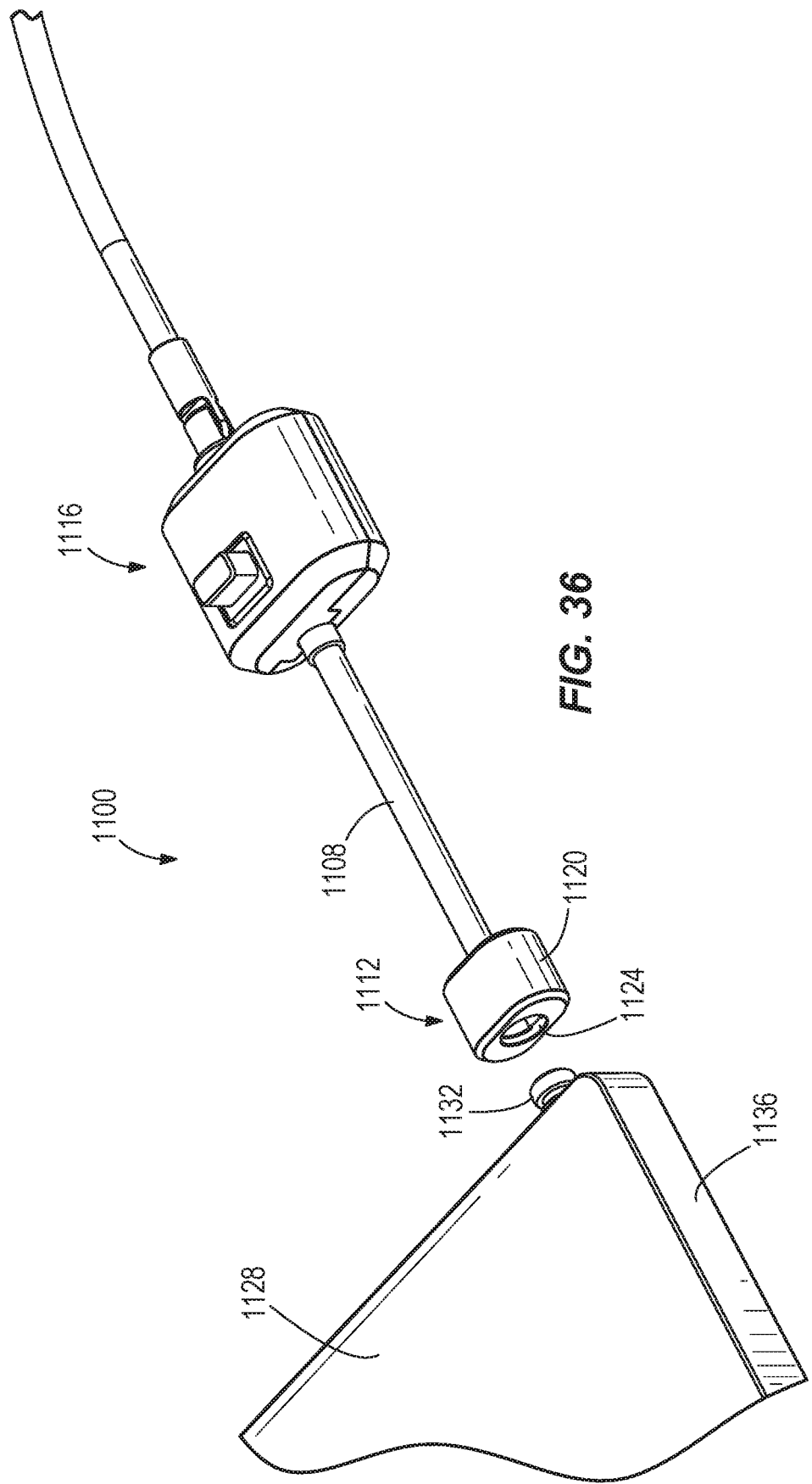
FIG. 36 is a perspective view of another security apparatus embodying the invention.

FIG. 36 illustrates another security apparatus 1100. The security apparatus 1100 is similar to the security apparatus 100 discussed above with reference to FIGS. 1-16. Reference is made to the description of the security apparatus 100 above for details of the structure and operation of the security apparatus 1100 not included below. The illustrated security apparatus 1100 includes a cable, an outer sheath 1108, a lock head 1112, and an actuator assembly 1116. The cable, the outer sheath 1108, and the actuator assembly 1116 are substantially the same as the cable 108, the outer sheath 128, and the actuator assembly 116 shown in FIGS. 1-16.

The lock head 1112 is coupled to an end of the cable opposite the actuator assembly 1116. The lock head 1112 includes a body 1120 having an opening 1124. The opening 1124 is configured to receive a portion of a portable electronic device 1128 to secure the lock head 1112 to the device 1128. In the illustrated embodiment, the opening 1124 receives a boss 1132 extending from a housing 1136 of the portable electronic device 1128. Gate structures (not shown) positioned within the body 1120 selectively engage the boss 1132 when the boss 1132 is inserted into the opening 1128. The illustrated lock head 1112 and boss 1132 may be similar to the locking heads and attachment devices disclosed in U.S. Pat. No. 7,997,106, issued Aug. 16, 2011, the entire contents of which are hereby incorporated by reference. The gate structures of the illustrated lock head 1112 are coupled to the cable such that actuating the actuator assembly 1116 moves the gate structures into and out of engagement with the boss 1132. When the gate structures engage the boss 1132, the lock head 1112 is secured to the portable electronic device 1128. When the gate structures disengage the boss 1132, the lock head 1112 is removable from the portable electronic device 1128.

FIGS. 37 and 38 illustrate another security apparatus 1200. The security apparatus 1200 is similar to the security apparatus 100 discussed above with reference to FIGS. 1-16. Reference is made to the description of the security apparatus 100 above for details of the structure and operation of the security apparatus 1200 not included below. The illustrated security apparatus 1200 includes a cable, an outer sheath 1208, a lock head 1212, and an actuator assembly 1216. The cable, the outer sheath 1208, and the actuator assembly 1216 are substantially the same as the cable 108, the outer sheath 128, and the actuator assembly 116 shown in FIGS. 1-16.

The illustrated lock head 1212 includes a body 1220 and two wedges 1224, 1228. The body 1220 is secured to an end of the cable opposite from the actuator assembly 1216. The first wedge 1224 is a stationary wedge. The stationary wedge 1224 extends axially from an end 1232 of the body 1220. The second wedge 1228 is a movable wedge. The movable wedge 1228 also extends axially from the end 1232 of the body 1220 and is coupled to the cable to move with the cable. When the movable wedge 1228 is in an unlocked position (FIG. 37), the wedge 1228 is slid into the body. In this position, the wedges 1224, 1228 can be inserted into or removed from a slot in a portable electronic device. When the movable wedge 1228 is in a locked position (FIG. 38), the wedge 1228 is slid out of the body. In this position, the wedges 1224, 1228 engage the portable electronic device to secure the lock head 1212 to the device.

In the illustrated embodiment, the actuator assembly 1216 and the cable are reconfigured compared to previous versions of security apparatuses so that the cable is pushed to move the movable wedge 1228 to the locked position and is released to move the movable wedge 1228 to the unlocked position.

Figure 39:
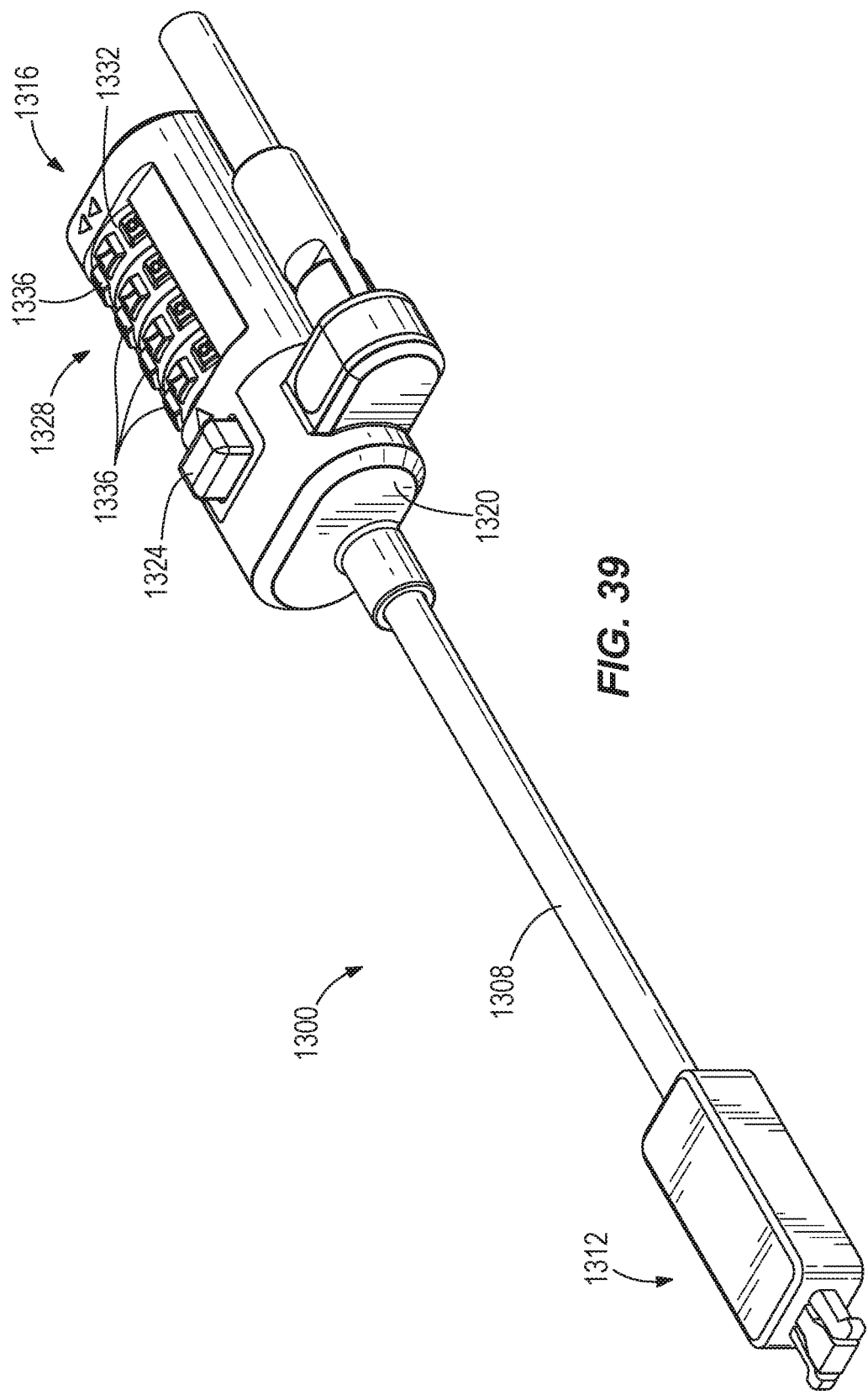
FIG. 39 is a perspective view of another security apparatus embodying the invention.

FIG. 39 illustrates another security apparatus 1300. The security apparatus 1300 is similar to the security apparatus 100 discussed above with reference to FIGS. 1-16. Reference is made to the description of the security apparatus 100 above for details of the structure and operation of the security apparatus 1300 not included below. The illustrated security apparatus 1300 includes a cable, an outer sheath 1308, a lock head 1312, and an actuator assembly 1316. The cable, the outer sheath 1308, and the lock head 1312 are substantially the same as the cable 108, the outer sheath 128, and the lock head 112 shown in FIGS. 1-16.

The illustrated actuator assembly 1316 includes a body 1320, a manual actuator 1324, and a lock mechanism 1328. The manual actuator 1324 is supported by and extends from the body 1320. In the illustrated embodiment, the manual actuator 1324 is a push button. The lock mechanism 1328 is also supported by the body 1320. In the illustrated embodiment, the lock mechanism 1328 includes a combination lock 1332 having four rotatable dials 1336. Each dial 1336 includes a series of numbers (e.g., 0 to 9) formed on the outer surface of the dial 1336. The dials 1336 may be rotated to input a proper combination into the lock mechanism 1328, thereby unlocking the lock mechanism 1328. When the correct combination is entered, the lock mechanism 1328 may function in a similar manner as the lock mechanism 180 shown in FIGS. 8A-10B to unlock the lock head 1312. In the illustrated embodiment, the dials 1336 rotate about an axis that is generally parallel to the longitudinal axis of the cable (when the cable is straightened), providing a generally in-line configuration for the lock mechanism 1328.

FIGS. 40-42 illustrate another security apparatus 1400. The security apparatus 1400 is similar to the security apparatus 100 discussed above with reference to FIGS. 1-16. Reference is made to the description of the security apparatus 100 above for details of the structure and operation of the security apparatus 1400 not included below. The illustrated security apparatus 1400 includes a cable, an outer sheath 1408, a lock head 1412, and an actuator assembly 1416. The cable, the outer sheath 1408, and the actuator assembly 1416 are substantially the same as the cable 108, the outer sheath 128, and the actuator assembly 116 shown in FIGS. 1-16.

The lock head 1412 is coupled to an end of the cable opposite from the actuator assembly 1416. The illustrated lock head includes a body 1420, an expandable portion 1424, and a plunger 1428. In the illustrated embodiment, the expandable portion 1424 includes four latches 1432, or fingers, that are configured to fit within a square-shaped opening 1436 in a portable electronic device 1440. FIG. 41 illustrates the latches 1432 in an unlocked position. In this position, the expandable portion 1424 can be inserted into and removed from the opening 1436. FIG. 42 illustrates the latches 1432 in a locked position. In this position, the expandable portion 1424 engages the portable electronic device 1440 to secure the lock head 1412 to the device 1440.

FIGS. 43-45 illustrate another security apparatus 1500. The security apparatus 1500 is similar to the security apparatus 100 discussed above with reference to FIGS. 1-16. Reference is made to the description of the security apparatus 100 above for details of the structure and operation of the security apparatus 1500 not included below. The illustrated security apparatus 1500 includes a cable, an outer sheath 1508, a lock head 1512, and an actuator assembly 1516. The cable, the outer sheath 1508, and the actuator assembly 1516 are substantially the same as the cable 108, the outer sheath 128, and the actuator assembly 116 shown in FIGS. 1-16.

The lock head 1512 is coupled to an end of the cable opposite from the actuator assembly 1516. The illustrated lock head 1512 includes a body 1520, an expandable portion 1524, and a plunger 1528. In the illustrated embodiment, the expandable portion 1524 includes three latches 1532, or fingers, that are configured to fit within a triangular-shaped opening 1536 in a portable electronic device 1540. FIG. 44 illustrates the latches 1532 in an unlocked position. In this position, the expandable portion 1524 can be inserted into and removed from the opening 1536. FIG. 45 illustrates the latches 1532 in a locked position. In this position, the expandable portion 1524 engages the portable electronic device 1540 to secure the lock head 1512 to the device 1540.

FIGS. 46-48 illustrate another security apparatus 1600. The security apparatus 1600 is similar to the security apparatus 100 discussed above with reference to FIGS. 1-16. Reference is made to the description of the security apparatus 100 above for details of the structure and operation of the security apparatus 1600 not included below. The illustrated security apparatus 1600 includes a cable, an outer sheath 1608, a lock head 1612, and an actuator assembly 1616. The cable, the outer sheath 1608, and the actuator assembly 1616 are substantially the same as the cable 108, the outer sheath 128, and the actuator assembly 116 shown in FIGS. 1-16.

The lock head 1612 is coupled to an end of the cable opposite from the actuator assembly 1616. The illustrated lock head 1612 includes a body 1620, an expandable portion 1624, and a plunger 1628. In the illustrated embodiment, the expandable portion 1624 includes four latches 1632, or fingers, that are configured to fit within a circular-shaped opening 1636 in a portable electronic device 1640. FIG. 47 illustrates the latches 1632 in an unlocked position. In this position, the expandable portion 1624 can be inserted into and removed from the opening 1636. FIG. 48 illustrates the latches 1632 in a locked position. In this position, the expandable portion 1624 engages the portable electronic device 1640 to secure the lock head 1612 to the device 1640.

FIG. 49 illustrates another security apparatus 1700. The security apparatus 1700 is similar to the security apparatus 100 discussed above with reference to FIGS. 1-16. Reference is made to the description of the security apparatus 100 above for details of the structure and operation of the security apparatus 1700 not included below. The illustrated security apparatus 1700 includes a cable, an outer sheath 1708, a lock head 1712, and an actuator assembly 1716. The cable, the outer sheath 1708, and the actuator assembly 1716 are substantially the same as the cable 108, the outer sheath 128, and the actuator assembly 116 shown in FIGS. 1-16.

The lock head 1712 is coupled to an end of the cable opposite from the actuator assembly 1716. The illustrated lock head 1712 includes a body 1720 and an expandable portion 1724. In the illustrated embodiment, the expandable portion 1724 is a scissor-type mechanism. The scissor-type mechanism 1724 is configured to fit within a slot in a portable electronic device. In particular, the scissor-type mechanism includes two latches 1728, or fingers, that are pivotally coupled to each other. When the actuator assembly 1716 is actuated to pull the cable, the cable causes the latches 1728 to pivot radially outward. As the latches 1728 pivot outwardly, the latches 1728 engage the portable electronic device to secure the lock head 1712 to the device.

FIG. 50 illustrates a security apparatus 1800 that is similar to the security apparatus 1700 shown in FIG. 49, and like parts have been given the same reference numbers. The lock head 1712 of the security apparatus 1800 of FIG. 50, however, includes a relatively larger scissor-type mechanism 1824 (e.g., larger latches or fingers 1828) that are operable to engage a relatively larger slot in a portable electronic device.

Figure 51:
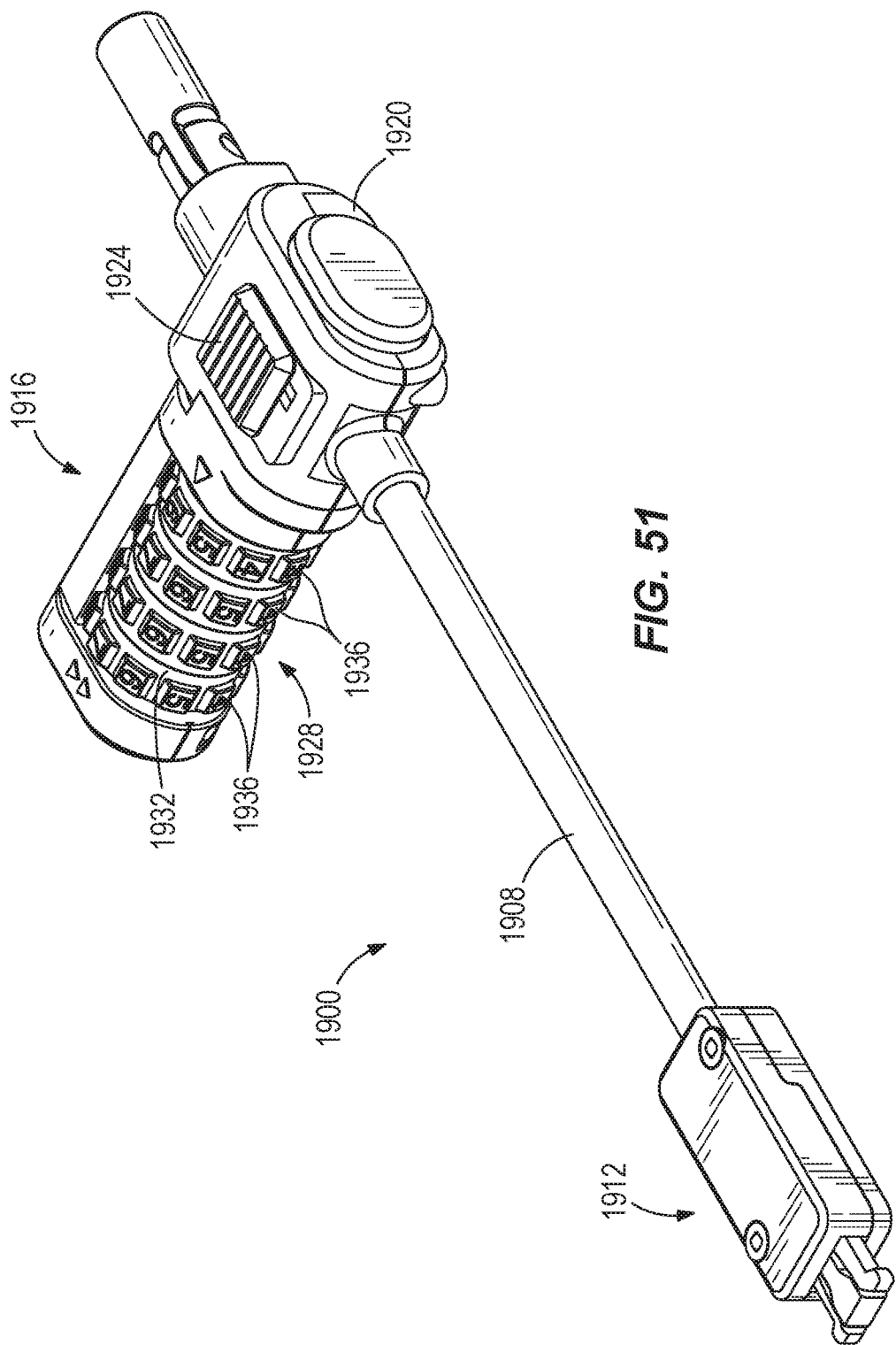
FIG. 51 is a perspective view of another security apparatus embodying the invention.

FIG. 51 illustrates another security apparatus 1900. The security apparatus 1900 is similar to the security apparatus 100 discussed above with reference to FIGS. 1-16 and to the security apparatus 1300 discussed above with reference to FIG. 39. Reference is made to the description of the security apparatuses 100, 1300 above for details of the structure and operation of the security apparatus 1900 not included below. The illustrated security apparatus 1900 includes a cable, an outer sheath 1908, a lock head 1912, and an actuator assembly 1916. The cable, the outer sheath 1908, and the lock head 1912 are substantially the same as the cable 108, the outer sheath 128, and the lock head 112 shown in FIGS. 1-16.

The illustrated actuator assembly 1916 includes a body 1920, a manual actuator 1924, and a lock mechanism 1928. The manual actuator 1924 is supported by the body 1920. In the illustrated embodiment, the manual actuator 1924 is a slidable lever or switch positioned on an outer surface of the body 1920. The lock mechanism 1928 is also supported by the body 1920. Similar to the lock mechanism 1328 (FIG. 39) discussed above, the lock mechanism 1928 includes a combination lock 1932 having four rotatable dials 1936. The dials 1936 are rotatable to input a proper combination into the lock mechanism 1928, thereby unlocking the lock mechanism 1928. Unlike the dials 1336 discussed above, however, the illustrated dials 1936 rotate about an axis that is perpendicular to the longitudinal axis of the cable (when the cable is straightened) so that the lock mechanism 1928 extends outwardly from the remainder of the security apparatus 1900.

Figure 52:
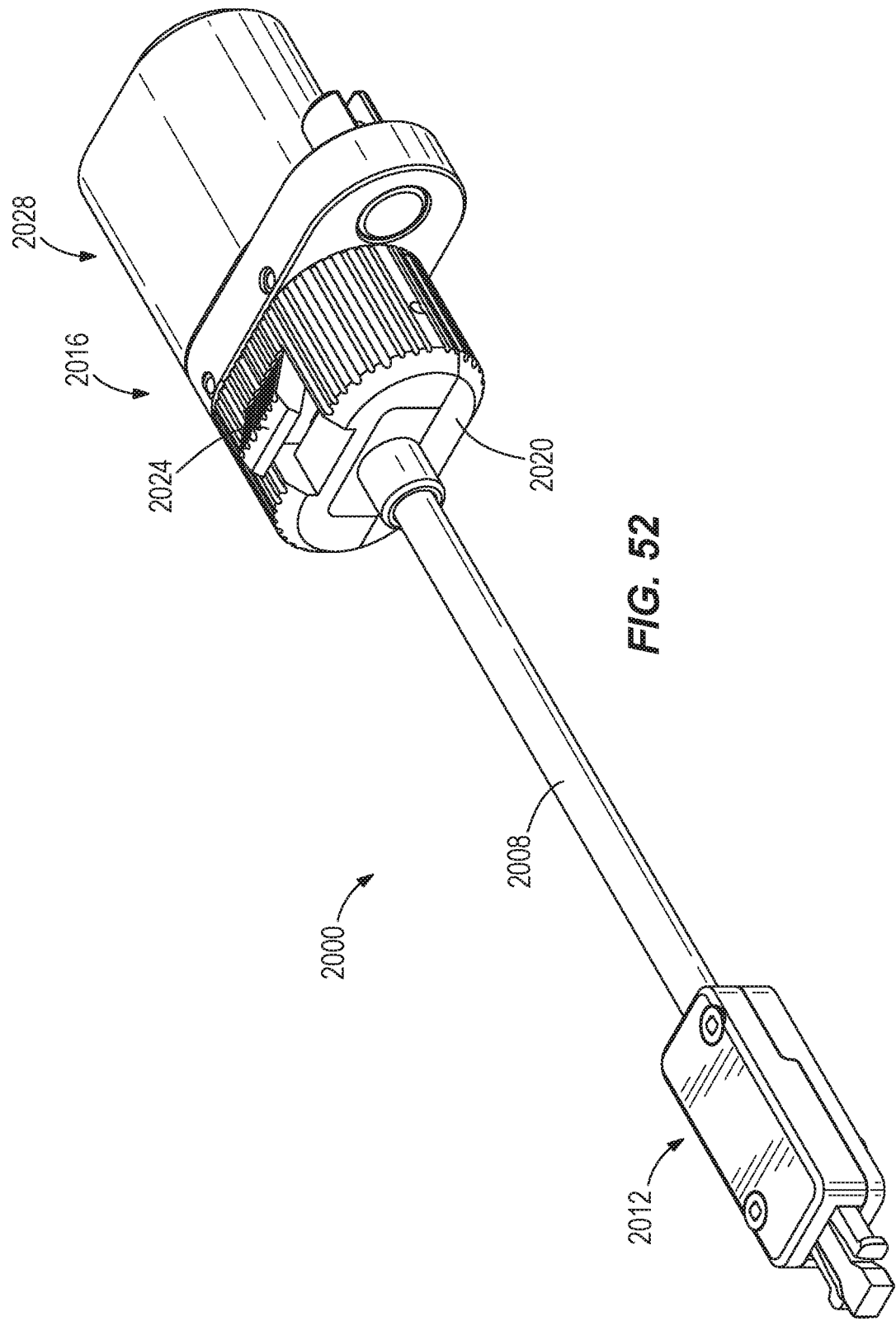
FIG. 52 is a perspective view of another security apparatus embodying the invention.

FIG. 52 illustrates another security apparatus 2000. The security apparatus 2000 is similar to the security apparatus 100 discussed above with reference to FIGS. 1-16. Reference is made to the description of the security apparatus 100 above for details of the structure and operation of the security apparatus 2000 not included below. The illustrated security apparatus 2000 includes a cable, an outer sheath 2008, a lock head 2012, and an actuator assembly 2016. The cable, the outer sheath 2008, and the lock head 2012 are substantially the same as the cable 108, the outer sheath 128, and the lock head 112 shown in FIGS. 1-16.

The illustrated actuator assembly 2016 includes a body 2020, a manual actuator 2024, and a lock mechanism 2028. The manual actuator 2024 extends from and is supported by the body 2020. Unlike the push button actuator 176 shown in FIGS. 1 and 2, the illustrated manual actuator 2024 is a pivotable lever. The lock mechanism 2028 is also supported by the body 2020. Similar to the lock mechanism 180 shown in FIGS. 6-10B, the lock mechanism 2028 can secure the actuator 2024 in a depressed position.

The illustrated security apparatuses allow the lock heads to be located remotely from the actuator assemblies (including the relatively bulky lock mechanisms) to reduce the possibility of blocking ports, buttons, or other sections of portable electronic devices. The lock heads only require minimum space on a device and can interface with devices less than 10 mm in height. In some embodiments, the lock heads can have dimensions between about 4 mm by 8 mm and about 9 mm by 12 mm. In addition, the security apparatuses are configured to withstand a minimum of axial pull forces of 150 lbf and side pull forces of 35 lbf. The security apparatuses described above thereby provide smaller attachments that interface with portable electronic devices, yet are still able to withstand substantial forces to secure the devices in place.

Various features and advantages of the invention are set forth in the following claims.

What is claimed is:

1. A security apparatus for a portable electronic device, the security apparatus comprising:
a force-transmission member having a length, a first end, and a second end;
a lock head coupled to the first end of the force-transmission member, the lock head configured to selectively engage the portable electronic device and movable by the force-transmission member between a locked position, in which the lock head is secured to the portable electronic device, and an unlocked position, in which the lock head is unsecured from the portable electronic device; and
an actuator assembly spaced a distance from the lock head along the length of the force-transmission member, the actuator assembly including a body and a manual actuator pivotally coupled to the body, the manual actuator being pivotable from a first position to a second position to move the force-transmission member relative to the body such that the lock head moves from the unlocked position to the locked position,
wherein the actuator assembly does not include a lock mechanism.

2. The security apparatus of claim 1, wherein the lock head is in the unlocked position when the manual actuator is in the first position, and wherein the lock head is in the locked position when the manual actuator is in the second position.

3. The security apparatus of claim 1, wherein the manual actuator further comprises a handle configured to be grasped by a user to pivot the manual actuator relative to the body.

4. The security apparatus of claim 3, wherein, in the first position, the handle is spaced apart from an upper surface of the body.

5. The security apparatus of claim 4, wherein, in the second position, the handle abuts the upper surface of the body.

6. The security apparatus of claim 1, wherein the actuator assembly includes a biasing member configured to bias the manual actuator relative to the body.

7. The security apparatus of claim 6, wherein the biasing member is configured to bias the manual actuator toward the first position, and wherein the actuator assembly further comprises a securement mechanism to hold the actuator in the second position.

8. The security apparatus of claim 6, wherein the biasing member is configured to bias the manual actuator toward the second position.

9. The security apparatus of claim 1, wherein the actuator assembly is configured to be secured to an immovable object.

10. The security apparatus of claim 1, wherein the force-transmission member includes a flexible cable.

11. The security system of claim 10, wherein the flexible cable is positioned within a sheath, and wherein the sheath is received in the body of the actuator assembly and further received in the lock head.

12. A security system comprising:
a security apparatus for a portable electronic device, the security apparatus comprising:
 a force-transmission member having a length, a first end, and a second end;
 a lock head coupled to the first end of the force-transmission member, the lock head configured to selectively engage the portable electronic device and movable by the force-transmission member between a locked position, in which the lock head is secured to the portable electronic device, and an unlocked position, in which the lock head is unsecured from the portable electronic device; and
 an actuator assembly spaced a distance from the lock head along the length of the force-transmission member; and
an enclosure having an outer wall, an interior volume at least partially defined by the outer wall, and an opening in the outer wall, wherein the actuator assembly is positioned within the interior volume and the force-transmission member extends through the opening such that the lock head is positioned outside of the enclosure,
wherein the opening is sized to be smaller than the actuator assembly such that the actuator assembly cannot extend through the opening,
wherein the opening is sized to be larger than the lock head such that the lock head can extend through the opening.

13. The security system of claim 12, wherein the security apparatus is a first security apparatus and the portable electronic device is a first portable electronic device, the security system further comprising a second security apparatus for a second portable electronic device, the second security apparatus comprising:
a force-transmission member having a length, a first end, and a second end;
a lock head coupled to the first end of the force-transmission member of the second security apparatus, the lock head of the second security apparatus configured to selectively engage the second portable electronic device and movable by the force-transmission member of the second security apparatus between a locked position, in which the lock head of the second security apparatus is secured to the second portable electronic device, and an unlocked position, in which the lock head of the second security apparatus is unsecured from the second portable electronic device; and
an actuator assembly spaced a distance from the lock head of the second security apparatus along the length of the force-transmission member of the second security apparatus,
wherein the actuator assembly of each of the first and second security apparatuses is positioned within the interior volume and the force-transmission member of each of the first and second security apparatuses extends through the opening such that the lock head of each of the first and second security apparatuses is positioned outside of the enclosure.

14. A security system comprising:
a security apparatus for a portable electronic device, the security apparatus comprising:
 a force-transmission member having a length, a first end, and a second end;
 a lock head coupled to the first end of the force-transmission member, the lock head configured to selectively engage the portable electronic device and movable by the force-transmission member between a locked position, in which the lock head is secured to the portable electronic device, and an unlocked position, in which the lock head is unsecured from the portable electronic device; and
 an actuator assembly spaced a distance from the lock head along the length of the force-transmission member; and
an enclosure having an outer wall, an interior volume at least partially defined by the outer wall, and an opening in the outer wall, wherein the actuator assembly is positioned within the interior volume and the force-transmission member extends through the opening such that the lock head is positioned outside of the enclosure,
wherein the enclosure includes a door separate from the opening to selectively provide access to the interior volume, and wherein the door includes a lock to inhibit unauthorized access of the interior volume.

15. A security apparatus for a portable electronic device, the security apparatus comprising:
a force-transmission member having a length, a first end, and a second end;
a lock head coupled to the first end of the force-transmission member, the lock head configured to selectively engage the portable electronic device and movable by the force-transmission member between a locked position, in which the lock head is secured to the portable electronic device, and an unlocked position, in which the lock head is unsecured from the portable electronic device; and
an actuator assembly spaced a distance from the lock head along the length of the force-transmission member, the actuator assembly including a body and a manual actuator pivotally coupled to the body, the manual actuator being pivotable from a first position to a second position to move the force-transmission member relative to the body such that the lock head moves from the unlocked position to the locked position,
wherein the manual actuator further comprises a flange secured to the second end of the cable to selectively move the cable relative to the body.

16. The security apparatus of claim 15, wherein, in the first position, the flange abuts a rear surface of the body.

17. The security apparatus of claim 16, wherein, in the second position, the flange is spaced apart from the rear surface of the body.

18. A security apparatus for a portable electronic device, the security apparatus comprising:
- a force-transmission member having a length, a first end, and a second end;
- a lock head coupled to the first end of the force-transmission member, the lock head configured to selectively engage the portable electronic device and movable by the force-transmission member between a locked position, in which the lock head is secured to the portable electronic device, and an unlocked position, in which the lock head is unsecured from the portable electronic device; and
- an actuator assembly spaced a distance from the lock head along the length of the force-transmission member, the actuator assembly including a body and a manual actuator pivotally coupled to the body, the manual actuator being pivotable from a first position to a second position to move the force-transmission member relative to the body such that the lock head moves from the unlocked position to the locked position,
- wherein the actuator assembly includes a biasing member configured to bias the manual actuator relative to the body.

* * * * *